United States Patent
Oehring et al.

(10) Patent No.: US 11,959,533 B2
(45) Date of Patent: Apr. 16, 2024

(54) MULTI-PLUNGER PUMPS AND ASSOCIATED DRIVE SYSTEMS

(71) Applicant: U.S. Well Services Holdings, LLC, Willow Park, TX (US)

(72) Inventors: Jared Oehring, Willow Park, TX (US); Lon Robinson, Willow Park, TX (US); Brandon N. Hinderliter, Willow Park, TX (US); Alexander James Christinzio, Willow Park, TX (US)

(73) Assignee: U.S. Well Services Holdings, LLC, Willow Park, TX (US)

( * ) Notice: Subject to any disclaimer, the term of this patent is extended or adjusted under 35 U.S.C. 154(b) by 0 days.

(21) Appl. No.: 18/357,271

(22) Filed: Jul. 24, 2023

(65) Prior Publication Data
US 2023/0366450 A1 Nov. 16, 2023

Related U.S. Application Data

(63) Continuation of application No. 16/827,166, filed on Mar. 23, 2020, now abandoned, which is a
(Continued)

(51) Int. Cl.
*E21B 43/26* (2006.01)
*E21B 37/00* (2006.01)
(Continued)

(52) U.S. Cl.
CPC ............... *F16H 3/52* (2013.01); *E21B 37/00* (2013.01); *E21B 43/20* (2013.01); *E21B 43/26* (2013.01);
(Continued)

(58) Field of Classification Search
CPC .......... E21B 37/00; E21B 43/20; E21B 43/26; F16H 3/52; F16H 39/02;
(Continued)

(56) References Cited

U.S. PATENT DOCUMENTS 1,541,601 A 6/1925 Tribe
1,656,861 A 1/1928 Leonard
(Continued)

FOREIGN PATENT DOCUMENTS

AU 2007340913 7/2008
CA 2406801 11/2001
(Continued)

OTHER PUBLICATIONS

"Global Cache iTach, IP to Serial with PoE (IP2SL-P)," Global Cache, https://www.amazon.com/Global-Cache-iTech-Serial-IP2SL-P/dp/B003BFVNS4/, Oct. 30, 2014, 3 pages.
(Continued)

*Primary Examiner* — D. Andrews
(74) *Attorney, Agent, or Firm* — Henry Patent Law Firm PLLC

(57) ABSTRACT

A hydraulic fracturing system for fracturing a subterranean formation is described according to various embodiments. In an embodiment, the system can include a multi-plunger hydraulic fracturing pump fluidly connected to a well associated with the subterranean formation, the multi-plunger pump configured to pump fluid into a wellbore associated with the well at a high pressure so that the fluid passes from the wellbore into the subterranean formation and fractures the subterranean formation. In an embodiment, a plurality of motors can be positioned to power the multi-plunger pump, and a planetary gear train can have a plurality of pinion gears in rotational contact with each of the plurality of motors. In an embodiment, a gear ratio of the planetary gear train and a speed at which the plurality of motors operates can be selected so as to limit a maximum pump speed associated with the multi-plunger pump.

25 Claims, 31 Drawing Sheets

Related U.S. Application Data continuation of application No. 16/210,807, filed on Dec. 5, 2018, now Pat. No. 10,598,258.

(60) Provisional application No. 62/594,912, filed on Dec. 5, 2017.

(51) Int. Cl.

| | | |
|---|---|---|
| *E21B 43/20* | (2006.01) | |
| *F04B 15/02* | (2006.01) | |
| *F04B 17/03* | (2006.01) | |
| *F04B 23/04* | (2006.01) | |
| *F04B 47/02* | (2006.01) | |
| *F04B 49/20* | (2006.01) | |
| *F16H 3/52* | (2006.01) | |

(52) U.S. Cl.
CPC .......... *E21B 43/2607* (2020.05); *F04B 15/02* (2013.01); *F04B 17/03* (2013.01); *F04B 23/04* (2013.01); *F04B 47/02* (2013.01); *F04B 49/20* (2013.01); *F16H 2200/2007* (2013.01)

(58) Field of Classification Search
CPC .. F16H 2200/2007; F04B 15/02; F04B 17/03; F04B 23/04; F04B 47/02; F04B 49/20
See application file for complete search history.

(56) References Cited

U.S. PATENT DOCUMENTS

| | | |
|---|---|---|
| 1,671,436 A | 5/1928 | Melott |
| 1,967,466 A | 7/1934 | Damsel |
| 2,004,077 A | 6/1935 | McCartney et al. |
| 2,183,364 A | 12/1939 | Bailey |
| 2,220,622 A | 11/1940 | Homer |
| 2,244,106 A | 6/1941 | Granberg et al. |
| 2,248,051 A | 7/1941 | Armstrong et al. |
| 2,407,796 A | 9/1946 | Page |
| 2,416,848 A | 3/1947 | Stewart |
| 2,610,741 A | 9/1952 | Schmid |
| 2,753,940 A | 7/1956 | Bonner |
| 3,055,682 A | 9/1962 | Bacher et al. |
| 3,061,039 A | 10/1962 | Peters |
| 3,066,503 A | 12/1962 | Fleming et al. |
| 3,302,069 A | 1/1967 | Wilcox |
| 3,334,495 A | 8/1967 | Jensen et al. |
| 3,347,570 A | 10/1967 | Roessler et al. |
| 3,722,595 A | 3/1973 | Kiel |
| 3,764,233 A | 10/1973 | Strickland |
| 3,773,140 A | 11/1973 | Mahajan et al. |
| 3,837,179 A | 9/1974 | Barth |
| 3,849,662 A | 11/1974 | Blaskowski et al. |
| 3,878,884 A | 4/1975 | Raleigh |
| 3,881,551 A | 5/1975 | Terry et al. |
| 3,967,841 A | 7/1976 | Kendrick et al. |
| 4,037,431 A | 7/1977 | Sugimoto |
| 4,100,822 A * | 7/1978 | Rosman .................. B61B 12/10 74/661 |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker et al. |
| 4,442,665 A | 4/1984 | Fick et al. |
| 4,456,092 A | 6/1984 | Kubozuka et al. |
| 4,506,982 A | 3/1985 | Smithers et al. |
| 4,512,387 A | 4/1985 | Rodriguez et al. |
| 4,529,887 A | 7/1985 | Johnson |
| 4,538,916 A | 9/1985 | Zimmerman |
| 4,676,063 A | 6/1987 | Goebel et al. |
| 4,759,674 A | 7/1988 | Schröder et al. |
| 4,783,038 A | 11/1988 | Gilbert et al. |
| 4,793,386 A | 12/1988 | Sloan |
| 4,845,981 A | 7/1989 | Pearson |
| 4,922,463 A | 5/1990 | Del Zotto et al. |
| 5,004,400 A | 4/1991 | Handke |
| 5,006,044 A | 4/1991 | Walker, Sr. et al. |
| 5,025,861 A | 6/1991 | Huber et al. |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley et al. |
| 5,230,366 A | 7/1993 | Marandi |
| 5,293,947 A | 3/1994 | Stratton |
| 5,334,899 A | 8/1994 | Skybyk |
| 5,366,324 A | 11/1994 | Arlt |
| 5,422,550 A | 6/1995 | McClanahan et al. |
| 5,433,243 A | 7/1995 | Griswold et al. |
| 5,439,066 A | 8/1995 | Gipson |
| 5,517,822 A | 5/1996 | Haws et al. |
| 5,548,093 A | 8/1996 | Sato et al. |
| 5,549,285 A | 8/1996 | Collins |
| 5,590,976 A | 1/1997 | Kilheffer et al. |
| 5,606,853 A | 3/1997 | Birch et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,791,636 A | 8/1998 | Loziuk |
| 5,798,596 A | 8/1998 | Lordo |
| 5,865,247 A | 2/1999 | Paterson |
| 5,879,137 A | 3/1999 | Yie |
| 5,894,888 A | 4/1999 | Wiemers et al. |
| 5,907,970 A | 6/1999 | Havlovick et al. |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira et al. |
| 6,208,098 B1 | 3/2001 | Kume et al. |
| 6,254,462 B1 | 7/2001 | Kelton et al. |
| 6,271,637 B1 | 8/2001 | Kushion |
| 6,273,193 B1 | 8/2001 | Hermann et al. |
| 6,315,523 B1 | 11/2001 | Mills |
| 6,406,011 B1 | 6/2002 | Kosar et al. |
| 6,477,852 B2 | 11/2002 | Dodo et al. |
| 6,484,490 B1 | 11/2002 | Olsen et al. |
| 6,491,098 B1 | 12/2002 | Dallas |
| 6,510,695 B1 | 1/2003 | Fisher |
| 6,529,135 B1 | 3/2003 | Bowers et al. |
| 6,626,646 B2 | 9/2003 | Rajewski |
| 6,719,900 B2 | 4/2004 | Hawkins |
| 6,765,304 B2 | 7/2004 | Baten et al. |
| 6,776,227 B2 | 8/2004 | Beida et al. |
| 6,788,022 B2 | 9/2004 | Sopko et al. |
| 6,802,690 B2 | 10/2004 | Han et al. |
| 6,808,303 B2 | 10/2004 | Fisher |
| 6,837,910 B1 | 1/2005 | Yoshikawa et al. |
| 6,931,310 B2 | 8/2005 | Shimizu et al. |
| 6,936,947 B1 | 8/2005 | Leijon et al. |
| 6,985,750 B1 | 1/2006 | Vicknair et al. |
| 7,082,993 B2 | 8/2006 | Ayoub et al. |
| 7,104,233 B2 | 9/2006 | Ryczek |
| 7,170,262 B2 | 1/2007 | Pettigrew |
| 7,173,399 B2 | 2/2007 | Sihler et al. |
| 7,279,655 B2 | 10/2007 | Blutke |
| 7,308,933 B1 | 12/2007 | Mayfield |
| 7,309,835 B2 | 12/2007 | Morrison |
| 7,312,593 B1 | 12/2007 | Streicher et al. |
| 7,336,514 B2 | 2/2008 | Amarillas et al. |
| 7,341,287 B2 | 3/2008 | Gibb et al. |
| 7,445,041 B2 | 11/2008 | O'Brien |
| 7,494,263 B2 | 2/2009 | Dykstra et al. |
| 7,500,642 B2 | 3/2009 | Cunningham et al. |
| 7,525,264 B2 | 4/2009 | Dodge |
| 7,563,076 B2 | 7/2009 | Brunet et al. |
| 7,581,379 B2 | 9/2009 | Yoshida et al. |
| 7,675,189 B2 | 3/2010 | Grenier |

(56) References Cited

U.S. PATENT DOCUMENTS

| | | |
|---|---|---|
| 7,683,499 B2 | 3/2010 | Saucier |
| 7,717,193 B2 | 5/2010 | Egilsson et al. |
| 7,755,310 B2 | 7/2010 | West et al. |
| 7,770,396 B2 | 8/2010 | Roby et al. |
| 7,795,830 B2 | 9/2010 | Johnson |
| 7,807,048 B2 | 10/2010 | Collette |
| 7,835,140 B2 | 11/2010 | Mori et al. |
| 7,845,413 B2 | 12/2010 | Shampine et al. |
| 8,083,504 B2 | 1/2011 | Williams et al. |
| 7,900,893 B2 | 3/2011 | Teurlay et al. |
| 7,926,562 B2 | 4/2011 | Poitzsch et al. |
| 7,940,039 B2 | 5/2011 | De Buda |
| 7,977,824 B2 | 7/2011 | Halen et al. |
| 7,984,757 B1 | 7/2011 | Keast et al. |
| 8,037,936 B2 | 10/2011 | Neuroth et al. |
| 8,054,084 B2 | 11/2011 | Schulz et al. |
| 8,091,928 B2 | 1/2012 | Carrier et al. |
| 8,096,354 B2 | 1/2012 | Poitzsch |
| 8,096,891 B2 | 1/2012 | Lochtefeld et al. |
| 8,139,383 B2 | 3/2012 | Efraimsson et al. |
| 8,146,665 B2 | 4/2012 | Neal |
| 8,154,419 B2 | 4/2012 | Daussin et al. |
| 8,221,513 B2 | 7/2012 | Ariyapadi et al. |
| 8,232,892 B2 | 7/2012 | Overholt et al. |
| 8,261,528 B2 | 9/2012 | Chillar et al. |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria et al. |
| RE44,444 E | 8/2013 | Dole et al. |
| 8,506,267 B2 | 8/2013 | Gambier et al. |
| 8,534,235 B2 | 9/2013 | Chandler |
| 8,556,302 B2 | 10/2013 | Dole |
| 8,573,303 B2 | 11/2013 | Kerfoot |
| 8,596,056 B2 | 12/2013 | Woodmansee et al. |
| 8,616,005 B1 | 12/2013 | Cousino, Sr. |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope et al. |
| 8,763,387 B2 | 7/2014 | Schmidt |
| 8,774,972 B2 | 7/2014 | Rusnak et al. |
| 8,789,601 B2 | 7/2014 | Broussard et al. |
| 8,795,525 B2 | 8/2014 | McGinnis et al. |
| 8,800,652 B2 | 8/2014 | Bartko et al. |
| 8,807,960 B2 | 8/2014 | Stephenson et al. |
| 8,838,341 B2 | 9/2014 | Kumano |
| 8,851,860 B1 | 10/2014 | Mail |
| 8,857,506 B2 | 10/2014 | Stone, Jr. et al. |
| 8,899,940 B2 | 12/2014 | Leugemors et al. |
| 8,905,056 B2 | 12/2014 | Kendrick |
| 8,905,138 B2 | 12/2014 | Lundstedt et al. |
| 8,997,904 B2 | 4/2015 | Cryer et al. |
| 9,018,881 B2 | 4/2015 | Mao et al. |
| 9,051,822 B2 | 6/2015 | Ayan et al. |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols et al. |
| 9,103,193 B2 | 8/2015 | Coli et al. |
| 9,119,326 B2 | 8/2015 | McDonnell et al. |
| 9,121,257 B2 | 9/2015 | Coli et al. |
| 9,140,110 B2 | 9/2015 | Coli et al. |
| 9,160,168 B2 | 10/2015 | Chapel et al. |
| 9,175,554 B1 | 11/2015 | Watson |
| 9,206,684 B2 | 12/2015 | Parra et al. |
| 9,260,253 B2 | 2/2016 | Naizer et al. |
| 9,322,239 B2 | 4/2016 | Angeles Boza et al. |
| 9,324,049 B2 | 4/2016 | Thomeer et al. |
| 9,340,353 B2 | 5/2016 | Oren et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 | 11/2016 | McIver et al. |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra et al. |
| 9,738,461 B2 | 8/2017 | Degaray et al. |
| 9,739,546 B2 | 8/2017 | Bertilsson et al. |
| 9,745,840 B2 | 8/2017 | Oehring et al. |
| 9,840,901 B2 | 12/2017 | Oehring et al. |
| 9,863,228 B2 | 1/2018 | Shampine et al. |
| 9,893,500 B2 | 2/2018 | Oehring et al. |
| 9,903,190 B2 | 2/2018 | Conrad et al. |
| 9,909,398 B2 | 3/2018 | Pham |
| 9,915,128 B2 | 3/2018 | Hunter |
| 9,932,799 B2 | 4/2018 | Symchuk |
| 9,963,961 B2 | 5/2018 | Hardin |
| 9,970,278 B2 | 5/2018 | Broussard et al. |
| 9,976,351 B2 | 5/2018 | Randall |
| 9,995,218 B2 | 6/2018 | Oehring et al. |
| 10,008,880 B2 | 6/2018 | Vicknair et al. |
| 10,020,711 B2 | 7/2018 | Oehring et al. |
| 10,036,238 B2 | 7/2018 | Oehring |
| 10,107,086 B2 | 10/2018 | Oehring et al. |
| 10,119,381 B2 | 11/2018 | Oehring et al. |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring et al. |
| 10,246,984 B2 | 4/2019 | Payne et al. |
| 10,254,732 B2 | 4/2019 | Oehring et al. |
| 10,260,327 B2 | 4/2019 | Kajaria et al. |
| 10,280,724 B2 | 5/2019 | Hinderliter |
| 10,287,873 B2 | 5/2019 | Filas et al. |
| 10,302,079 B2 | 5/2019 | Kendrick |
| 10,309,205 B2 | 6/2019 | Randall |
| 10,337,308 B2 | 7/2019 | Broussard et al. |
| 10,371,012 B2 | 8/2019 | Davis et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,030 B2 | 9/2019 | Oehring et al. |
| 10,408,031 B2 | 9/2019 | Oehring et al. |
| 10,415,332 B2 | 9/2019 | Morris et al. |
| 10,436,026 B2 | 10/2019 | Ounadjela et al. |
| 1,743,771 A1 | 1/2020 | Oehring et al. |
| 10,526,882 B2 | 1/2020 | Oehring |
| 10,598,258 B2 * | 3/2020 | Oehring ............. F04B 49/20 |
| 10,627,003 B2 | 4/2020 | Dale et al. |
| 10,648,311 B2 | 5/2020 | Oehring et al. |
| 10,669,471 B2 | 6/2020 | Schmidt et al. |
| 10,669,804 B2 | 6/2020 | Kotrla et al. |
| 10,690,131 B2 | 6/2020 | Rashid et al. |
| 10,695,950 B2 | 6/2020 | Igo et al. |
| 10,711,576 B2 | 7/2020 | Bishop |
| 10,740,730 B2 | 8/2020 | Altamirano et al. |
| 10,794,165 B2 | 10/2020 | Fischer et al. |
| 10,934,824 B2 | 3/2021 | Oehring et al. |
| 11,091,992 B2 | 8/2021 | Broussard et al. |
| 2001/0000996 A1 | 5/2001 | Grimland et al. |
| 2002/0169523 A1 | 11/2002 | Ross et al. |
| 2003/0056514 A1 | 3/2003 | Lohn |
| 2003/0057704 A1 | 3/2003 | Baten |
| 2003/0079875 A1 | 5/2003 | Weng |
| 2003/0138327 A1 | 7/2003 | Jones et al. |
| 2004/0040746 A1 | 3/2004 | Niedermayr et al. |
| 2004/0102109 A1 | 5/2004 | Cratty et al. |
| 2004/0167738 A1 | 8/2004 | Miller |
| 2005/0061548 A1 | 3/2005 | Hooper et al. |
| 2005/0116541 A1 | 6/2005 | Seiver |

(56) References Cited

U.S. PATENT DOCUMENTS

| | | |
|---|---|---|
| 2005/0201197 A1 | 9/2005 | Duell et al. |
| 2005/0274508 A1 | 12/2005 | Folk et al. |
| 2006/0052903 A1 | 3/2006 | Bassett |
| 2006/0065319 A1 | 3/2006 | Csitari |
| 2006/0109141 A1 | 5/2006 | Huang et al. |
| 2006/0260331 A1 | 11/2006 | Andreychuk |
| 2007/0125544 A1 | 6/2007 | Robinson et al. |
| 2007/0131410 A1 | 6/2007 | Hill et al. |
| 2007/0187163 A1 | 8/2007 | Cone et al. |
| 2007/0201305 A1 | 8/2007 | Heilman et al. |
| 2007/0226089 A1 | 9/2007 | Degaray et al. |
| 2007/0277982 A1 | 12/2007 | Shampine et al. |
| 2007/0278140 A1 | 12/2007 | Mallett et al. |
| 2008/0017369 A1 | 1/2008 | Sarada |
| 2008/0041596 A1 | 2/2008 | Blount et al. |
| 2008/0095644 A1 | 4/2008 | Mantei et al. |
| 2008/0112802 A1 | 5/2008 | Orlando et al. |
| 2008/0137266 A1 | 6/2008 | Jensen et al. |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264640 A1 | 10/2008 | Eslinger |
| 2008/0264649 A1 | 10/2008 | Crawford |
| 2008/0277120 A1 | 11/2008 | Hickie |
| 2008/0288115 A1 | 11/2008 | Rusnak et al. |
| 2009/0045782 A1 | 2/2009 | Datta et al. |
| 2009/0065299 A1 | 3/2009 | Vito et al. |
| 2009/0068031 A1 | 3/2009 | Gambier et al. |
| 2009/0072645 A1 | 3/2009 | Quere |
| 2009/0078410 A1 | 3/2009 | Krenek et al. |
| 2009/0090504 A1 | 4/2009 | Weightman et al. |
| 2009/0093317 A1 | 4/2009 | Kajiwara et al. |
| 2009/0095482 A1 | 4/2009 | Surjaatmadja |
| 2009/0114392 A1 | 5/2009 | Tolman et al. |
| 2009/0145611 A1 | 6/2009 | Pallini, Jr. et al. |
| 2009/0153354 A1 | 6/2009 | Duassin et al. |
| 2009/0188181 A1 | 7/2009 | Forbis et al. |
| 2009/0200035 A1 | 8/2009 | Bjerkreim et al. |
| 2009/0260826 A1 | 10/2009 | Sherwood et al. |
| 2009/0308602 A1 | 12/2009 | Bruins et al. |
| 2009/0315297 A1 | 12/2009 | Nadeau et al. |
| 2010/0000508 A1 | 1/2010 | Chandler |
| 2010/0019574 A1 | 1/2010 | Baldassarre et al. |
| 2010/0038907 A1 | 2/2010 | Hunt et al. |
| 2010/0045109 A1 | 2/2010 | Arnold |
| 2010/0051272 A1 | 3/2010 | Loree et al. |
| 2010/0101785 A1 | 4/2010 | Khvoshchev et al. |
| 2010/0132949 A1 | 6/2010 | Defosse et al. |
| 2010/0146981 A1 | 6/2010 | Motakef et al. |
| 2010/0172202 A1 | 7/2010 | Borgstadt |
| 2010/0193057 A1 | 8/2010 | Garner |
| 2010/0200224 A1 | 8/2010 | Nguete et al. |
| 2010/0250139 A1 | 9/2010 | Hobbs et al. |
| 2010/0281876 A1 | 11/2010 | Khan et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Herbert |
| 2011/0017468 A1 | 1/2011 | Birch et al. |
| 2011/0052423 A1 | 3/2011 | Gambier et al. |
| 2011/0061855 A1 | 3/2011 | Case et al. |
| 2011/0085924 A1 | 3/2011 | Shampine et al. |
| 2011/0081268 A1 | 4/2011 | Ochoa et al. |
| 2011/0110793 A1 | 5/2011 | Leugemors et al. |
| 2011/0166046 A1 | 7/2011 | Weaver et al. |
| 2011/0175397 A1 | 7/2011 | Amrine, Jr. et al. |
| 2011/0197988 A1 | 8/2011 | Van Vliet et al. |
| 2011/0241590 A1 | 10/2011 | Horikoshi et al. |
| 2011/0247878 A1 | 10/2011 | Rasheed et al. |
| 2011/0272158 A1 | 11/2011 | Neal |
| 2012/0018016 A1 | 1/2012 | Gibson et al. |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0112757 A1 | 5/2012 | Vrankovic et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | Degaray et al. |
| 2012/0222865 A1 | 9/2012 | Larson et al. |
| 2012/0232728 A1 | 9/2012 | Karimi et al. |
| 2012/0247783 A1 | 10/2012 | Berner, Jr. et al. |
| 2012/0255734 A1 | 10/2012 | Coli et al. |
| 2013/0009469 A1 | 1/2013 | Gillett |
| 2013/0025706 A1 | 1/2013 | Degaray et al. |
| 2013/0078114 A1 | 3/2013 | Van Rijswick et al. |
| 2013/0138254 A1 | 5/2013 | Seals |
| 2013/0175038 A1 | 7/2013 | Conrad |
| 2013/0175039 A1 | 7/2013 | Guidry |
| 2013/0180722 A1 | 7/2013 | Olarte Caro |
| 2013/0189629 A1 | 7/2013 | Chandler |
| 2013/0199617 A1 | 8/2013 | Degaray et al. |
| 2013/0233542 A1 | 9/2013 | Shampine et al. |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce et al. |
| 2013/0306322 A1 | 11/2013 | Sanborn et al. |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains et al. |
| 2014/0077607 A1 | 3/2014 | Clarke et al. |
| 2014/0095114 A1 | 4/2014 | Thomeer et al. |
| 2014/0096974 A1 | 4/2014 | Coli et al. |
| 2014/0124162 A1 | 5/2014 | Leavitt |
| 2014/0138079 A1 | 5/2014 | Broussard et al. |
| 2014/0174717 A1 | 6/2014 | Broussard et al. |
| 2014/0219824 A1 | 8/2014 | Burnette |
| 2014/0238683 A1 | 8/2014 | Korach et al. |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez et al. |
| 2014/0290768 A1 | 10/2014 | Randle et al. |
| 2014/0294603 A1 | 10/2014 | Best |
| 2014/0379300 A1 | 12/2014 | Devine et al. |
| 2015/0027712 A1 | 1/2015 | Vicknair et al. |
| 2015/0053426 A1 | 2/2015 | Smith et al. |
| 2015/0068724 A1 | 3/2015 | Coli et al. |
| 2015/0068754 A1 | 3/2015 | Coli et al. |
| 2015/0075778 A1 | 3/2015 | Walters et al. |
| 2015/0083426 A1 | 3/2015 | Lesko et al. |
| 2015/0097504 A1 | 4/2015 | Lamascus et al. |
| 2015/0114652 A1 | 4/2015 | Lestz et al. |
| 2015/0136043 A1 | 5/2015 | Shaaban et al. |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman et al. |
| 2015/0211524 A1 | 7/2015 | Broussard et al. |
| 2015/0217672 A1 | 8/2015 | Shampine et al. |
| 2015/0225113 A1 | 8/2015 | Lungu et al. |
| 2015/0233530 A1 | 8/2015 | Sandidge |
| 2015/0252661 A1 | 9/2015 | Glass |
| 2015/0300145 A1 | 10/2015 | Coli et al. |
| 2015/0314225 A1 | 11/2015 | Parsons et al. |
| 2015/0330172 A1 | 11/2015 | Allmaras et al. |
| 2015/0354322 A1 | 12/2015 | Mcknair et al. |
| 2015/0361736 A1* | 12/2015 | Bergan ............... B66D 1/22 414/803 |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1 | 4/2016 | Oehring et al. |

(56) References Cited

U.S. PATENT DOCUMENTS

| | | |
|---|---|---|
| 2016/0160889 A1 | 6/2016 | Hoffman et al. |
| 2016/0177675 A1 | 6/2016 | Morris et al. |
| 2016/0177678 A1 | 6/2016 | Morris et al. |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang et al. |
| 2016/0221220 A1 | 8/2016 | Paige |
| 2016/0230524 A1 | 8/2016 | Dumoit et al. |
| 2016/0230525 A1 | 8/2016 | Lestz et al. |
| 2016/0258267 A1 | 9/2016 | Payne et al. |
| 2016/0265457 A1 | 9/2016 | Stephenson et al. |
| 2016/0273328 A1 | 9/2016 | Oehring |
| 2016/0273456 A1 | 9/2016 | Zhang |
| 2016/0281484 A1 | 9/2016 | Lestz et al. |
| 2016/0290114 A1 | 10/2016 | Oehring et al. |
| 2016/0290563 A1 | 10/2016 | Diggins |
| 2016/0312108 A1 | 10/2016 | Lestz et al. |
| 2016/0319650 A1 | 11/2016 | Oehring et al. |
| 2016/0326853 A1 | 11/2016 | Fredd et al. |
| 2016/0326854 A1 | 11/2016 | Broussard et al. |
| 2016/0326855 A1 | 11/2016 | Coli et al. |
| 2016/0341281 A1 | 11/2016 | Brunvold et al. |
| 2016/0348479 A1 | 12/2016 | Oehring et al. |
| 2016/0349728 A1 | 12/2016 | Oehring et al. |
| 2016/0369609 A1 | 12/2016 | Morris et al. |
| 2017/0016433 A1 | 1/2017 | Chong et al. |
| 2017/0021318 A1 | 1/2017 | McIver |
| 2017/0022788 A1 | 1/2017 | Oehring et al. |
| 2017/0022807 A1 | 1/2017 | Dursun et al. |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring et al. |
| 2017/0037718 A1 | 2/2017 | Coli et al. |
| 2017/0043280 A1 | 2/2017 | Vankouwenberg |
| 2017/0051732 A1 | 2/2017 | Hernandez et al. |
| 2017/0074076 A1 | 3/2017 | Joseph et al. |
| 2017/0082033 A1 | 3/2017 | Wu et al. |
| 2017/0096885 A1 | 4/2017 | Oehring et al. |
| 2017/0096889 A1 | 4/2017 | Blanckaert et al. |
| 2017/0104389 A1 | 4/2017 | Morris et al. |
| 2017/0114625 A1* | 4/2017 | Norris ................ E21B 43/2607 |
| 2017/0130743 A1 | 5/2017 | Anderson |
| 2017/0138171 A1 | 5/2017 | Richards et al. |
| 2017/0145918 A1 | 5/2017 | Oehring et al. |
| 2017/0146189 A1 | 5/2017 | Herman et al. |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett, Jr. |
| 2017/0212535 A1 | 7/2017 | Shelman et al. |
| 2017/0218727 A1 | 8/2017 | Oehring et al. |
| 2017/0218843 A1 | 8/2017 | Oehring et al. |
| 2017/0222409 A1 | 8/2017 | Oehring et al. |
| 2017/0226838 A1 | 8/2017 | Ciezobka et al. |
| 2017/0226839 A1 | 8/2017 | Broussard et al. |
| 2017/0226842 A1 | 8/2017 | Omont et al. |
| 2017/0234250 A1 | 8/2017 | Janik |
| 2017/0241221 A1 | 8/2017 | Seshadri et al. |
| 2017/0259227 A1 | 9/2017 | Morris et al. |
| 2017/0292513 A1 | 10/2017 | Haddad et al. |
| 2017/0313499 A1 | 11/2017 | Hughes et al. |
| 2017/0314380 A1 | 11/2017 | Oehring et al. |
| 2017/0328179 A1 | 11/2017 | Dykstra et al. |
| 2017/0369258 A1 | 12/2017 | Degaray et al. |
| 2017/0370639 A1 | 12/2017 | Bardon et al. |
| 2018/0028992 A1 | 2/2018 | Stegemoeller et al. |
| 2018/0038216 A1 | 2/2018 | Zhang et al. |
| 2018/0045331 A1 | 2/2018 | Lopez et al. |
| 2018/0090914 A1 | 3/2018 | Johnson et al. |
| 2018/0156210 A1 | 6/2018 | Oehring et al. |
| 2018/0181830 A1 | 6/2018 | Luharuka et al. |
| 2018/0183219 A1 | 6/2018 | Oehring et al. |
| 2018/0216455 A1 | 8/2018 | Andreychuk et al. |
| 2018/0238147 A1 | 8/2018 | Shahri et al. |
| 2018/0245428 A1 | 8/2018 | Richards |
| 2018/0258746 A1 | 9/2018 | Broussard et al. |
| 2018/0259080 A1 | 9/2018 | Dale et al. |
| 2018/0266217 A1 | 9/2018 | Funkhouser et al. |
| 2018/0266412 A1 | 9/2018 | Stokkevåg et al. |
| 2018/0274446 A1 | 9/2018 | Oehring et al. |
| 2018/0284817 A1 | 10/2018 | Cook et al. |
| 2018/0291713 A1 | 10/2018 | Jeanson |
| 2018/0298731 A1 | 10/2018 | Bishop et al. |
| 2018/0312738 A1 | 11/2018 | Rutsch et al. |
| 2018/0313677 A1 | 11/2018 | Warren et al. |
| 2018/0320483 A1 | 11/2018 | Zhang et al. |
| 2018/0343125 A1 | 11/2018 | Clish et al. |
| 2018/0363437 A1 | 12/2018 | Coli et al. |
| 2018/0363640 A1 | 12/2018 | Kajita et al. |
| 2019/0003329 A1 | 1/2019 | Morris et al. |
| 2019/0010793 A1 | 1/2019 | Hinderliter |
| 2019/0040727 A1 | 2/2019 | Oehring et al. |
| 2019/0063309 A1 | 2/2019 | Davis |
| 2019/0100989 A1 | 4/2019 | Stewart et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0128080 A1 | 5/2019 | Ross et al. |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring et al. |
| 2019/0178057 A1 | 6/2019 | Hunter |
| 2019/0178235 A1 | 6/2019 | Coskrey et al. |
| 2019/0203567 A1 | 7/2019 | Ross et al. |
| 2019/0203572 A1 | 7/2019 | Morris et al. |
| 2019/0211661 A1 | 7/2019 | Reckels et al. |
| 2019/0226317 A1 | 7/2019 | Payne et al. |
| 2019/0245348 A1 | 8/2019 | Hinderliter et al. |
| 2019/0249527 A1 | 8/2019 | Kraynek |
| 2019/0257462 A1 | 8/2019 | Rogers |
| 2019/0292866 A1 | 9/2019 | Ross et al. |
| 2019/0292891 A1 | 9/2019 | Kajaria |
| 2019/0316447 A1 | 10/2019 | Oehring et al. |
| 2020/0047141 A1 | 2/2020 | Oehring et al. |
| 2020/0088152 A1 | 3/2020 | Alloin |
| 2020/0232454 A1 | 7/2020 | Chretien et al. |
| 2020/0256429 A1* | 8/2020 | Buckley ................ F04B 49/06 |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 | 1/2019 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |
| CN | 104117308 | 10/2014 |
| CN | 104196613 | 12/2014 |
| CN | 205986303 | 2/2017 |
| CN | 108049999 | 5/2018 |

(56) References Cited

FOREIGN PATENT DOCUMENTS

| | | |
|---|---|---|
| CN | 112196508 | 1/2021 |
| JP | 2004264589 | 9/2004 |
| WO | 200047893 | 8/2000 |
| WO | 2012051705 | 4/2012 |
| WO | 2014116761 | 7/2014 |
| WO | 2014177346 | 11/2014 |
| WO | 2016144939 | 9/2016 |
| WO | 2016160458 | 10/2016 |
| WO | 2018044307 | 3/2018 |
| WO | 2018213925 | 11/2018 |

OTHER PUBLICATIONS

"Griswold Model 811 Pumps: Installation, Operation and Maintenance Manual, ANSI Process Pump", 2010, 60 pages.
"Halliburton Delivers Successful Grid-Powered Frac Operation," https://www.halliburton.com/en/about-us/press-release/halliburton-delivers-first-successful-grid-powered-fracturing-operation, accessed Sep. 27, 2021, 4 pages.
"Heat Exchanger" (https://en.wikipedia.org/w/index.php?title=Heat_exchanger&oldid=89300146) Dec. 18, 2019 Apr. 2019 (Apr. 18, 2019), entire document, especially para [0001].
"Process Burner" (https://www.cebasrt.com/productsloii-gaslprocess-burner) 06 Sep. 6, 2018 (Sep. 6, 2018), entire document, especially para (Burners for refinery Heaters).
"SainSmart TCP/IP Ethernet to Serial RS232 RS485 Intelligent Communication Converter," SainSmart, http://www.amazon.com/SainSmart-Ethernet-Intelligent-Communication-Converter/dp/B008GLUHW, Aug. 17, 2024, 4 pages.
"Services—U.S. Well Services," http://uswellservices.com/services/, accessed Nov. 13, 2021, 10 pages.
"StarTech NETRS2321E 1 Port RS-232/422/485 Serial over IP Ethernet Device Server," StarTech, https://www.amazon.com/StarTech-NETRS2321E-RS232-Serial-Ethernet/dp/B000YN0N0S, May 31, 2014, 4 pages.
"StarTech.com 1 Port RS232 Serial to IP Ethernet Converter (NETRS2321P)," StarTech, hhtps://www.amazon.com/StarTech-com-Serial-Ethernet-Converter-NETRS232IP/dp/B00FJEHNSO, Oct. 9, 2014, 4 pages.
"TCP/IP Ethernet to Serial RS232 RS485 RS422 Converter," Atc, http://www.amazon.com/Ethernet-Serial-RS232-RS485-Converter/dp/B00ATV2DX2, Feb. 1, 2014, 2 pages.
Water and Glycol Heating Systems (https://www.heat-inc.com/wg-series-water-glycol-systems/) Jun. 18, 2018 (Jun. 18, 2018), entire document, especially WG Series Water Glycol Systems.
A. Abbott, Crippling the Innovation Economy: Regulatory Overreach at the Patent Office, Regulatory Transparency Project, Aug. 14, 2017, 35 pages.
A.B. Lobo Roberio et al., "Multipoint-Fiber-Optic Hot Spot Sensing Network Integrated Into High Power Transformer for Continuous Monitoring," IEEE Sensor Journal, Jul. 2008, vol. 8, No. 7, pp. 1264-1267.
About Us, Moxastore, http://www.moxastore.com/aboutus.asp, Mar. 8, 2015, 1 page.
Accommodating Seismic Movement, Victaulic Company, 2015, https://web.archive.org/web/20150412042941/http://www.victauluic.com:80/en/business-solutions/solutions/accommoda . . . , 2 pages.
AGS Large Diameter Solutions, Victaulic Company 2015, https://web.archive.org/web/20150419063052/http://www.victaulic.com:80/en/businesses-solutions/solutions/adavanced-gr . . . ,2 pages.
Albone, "Mobile Compressor Stations for Natural Gas Transmission Service," ASME 67-GT-33, Turbo Expo, Power for Land, Sea and Air, vol. 79887, p. 1-10, 1967.
America Invents Act, H.R. Rep. No. 112-98, Jun. 1, 2011, 165 pages.
American Petroleum Insitute, "Form-wound Squirrel-Cage Induction Motors—500 Horsepower and Larger," Jun. 2004, Fourth Edition, ANSI/API Standard 541-2003, 88 pages.
Approved American National Standard, ANSI/NEMA MG Jan. 2011, American National Standard Motors and Generators, Dec. 9, 2021, 636 pages.
Assignment record of U.S. Pat. No. 9,366,114 accessed Aug. 19, 2021, 2 pages.
ASTM International, "Standard Specification for Steel Bars, carbon and Alloy, Hot-Wrought, General Requirements" Oct. 13, 2006, 16 pages.
Bernard D. Goldstein, The Role of Toxicological Science in Meeting the Challenges and Opportunities of Hydraulic Fracturing, 2014, Toxicological Sciences, vol. 139, No. 2, pp. 271-283.
Bill Lockley and Barry Wood, "What do the API Motor/ Generator Features Cost and What Do They Buy You?" 2010 IEEE, Paper No. PCIC-2010-22, 10 pages.
C.F.R. Part 393 (Oct. 1, 2006), 36 pages.
Canadian Office Action dated Apr. 18, 2018 in related Canadian Patent Application No. 2,298,711.
Canadian Office Action dated Jun. 22, 2018 in related Canadian Patent Application No. 2,886,697.
Canadian Office Action dated Mar. 2, 2018 in related Canadian Patent Application No. 2,833,711.
Canadian Office Action dated Sep. 28, 2018 in related Canadian Patent Application No. 2,945,281.
Canadian Office Action dated Aug. 31, 2020 in Candian Patent Application No. 2,944,980.
Canadian Office Action dated Sep. 22, 2020 in Canadian Application No. 2,982,974.
Canadian Office Action dated Sep. 8, 2020 in Candian Patent Application No. 2,928,707.
Canadian Office Action dated Aug. 17, 2020 in related CA Patent Application No. 2,944,968.
Canadian Office Action dated Aug. 18, 2020 in related CA Patent Application No. 2,933,444.
Canadian Office Action dated Jun. 20, 2019 in corresponding CA Application No. 2,964,597.
Canadian Office Action dated May 30, 2019 in corresponding CA Application No. 2,833,711.
Canadian Office Action dated Oct. 1, 2019 in related Canadian Patent Application No. 2,936,997.
Centers for Disease Control and Prevention, NIOSH Numbered Publications, https://web.archive.org/web/20120721180008/http://www.cdc.org/niosh/pubs/all_date_esc_nopubnumbers.htlm, 2021, 57 pages.
Chiksan Original Swivel Joints, FMC, 1997, 16 pages.
Clean Fleet Reduces Emissions by 99% at Hydraulic Fracturing Sites, Fluid Power Journal, https://fluidpowerjournal.com/clean-fleet-reduces-emissions/, accessed Sep. 22, 2021, 5 pages.
Collins English Dictionary, Twelfth Edition, 2014, p. 1005.
Comprehensive Power: Power it Up, Brochure, 26 pages.
Comprehensive Power: Power it Up, Feb. 27, 2013, 28 pages.
CoorsTek Flowguard Products, 2012, 8 pages.
D. Heidel, Safety and Health Management Aspects for Handling Silica-based Products and Engineered Nanoparticles in Sequence of Shale Reservoir Stimulations Operations, Society of Petroleum Engineers, 2004, 4 pages.
Declaration of Dr. L. Brun Hilbert, Jr., P.E., IPR2021-01538, Sep. 22, 2021, 99 pages.
Declaration of Dr. L. Brun Hilbert, P.E., IPR2021-01037 and IPR2021-01038, Jun. 21, 2021, 124 pages.
Declaration of Dr. Mark Ehsani, IPR2021-01035, Jun. 18, 2021, 188 pages.
Declaration of Dr. Robert Durham, Case Nos. IPR2021-01033, IPR2021-01032 and IPR2021-01034, Jun. 18, 2021, 179 pages.
Non-Final Office Action dated Jan. 29, 2021 in U.S. Appl. No. 16/564,185.
Non-Final Office Action dated Jan. 4, 2021 in U.S. Appl. No. 16/522,043.
Non-Final Office Action dated Mar. 6, 2019 in related U.S. Appl. No. 15/183,387.
Non-Final Office Action dated Sep. 2, 2020 in U.S. Appl. No. 16/356,263.
Non-Final Office Action dated Sep. 29, 2020 in U.S. Appl. No. 16/943,727.

(56) References Cited

OTHER PUBLICATIONS

Non-Final Office dated Oct. 26, 2020 in U.S. Appl. No. 15/356,436.
Non-Final Office dated Oct. 5, 2020 in U.S. Appl. No. 16/443,273.
Notice of Allowance and Notice of Allowability issued in U.S. Appl. No. 15/829,419 dated Jul. 26, 2021.
Notice of Allowance issued in corresponding U.S. Appl. No. 14/622,532 dated Mar. 27, 2017.
Notice of Allowance issued in corresponding U.S. Appl. No. 15/217,040 dated Mar. 28, 2017.
Notice Of Allowance dated Apr. 23, 2019 in corresponding U.S. Appl. No. 15/635,028.
Notice of Allowance dated Jan. 9, 2020 in related U.S. Appl. No. 16/570,331.
Occupational Safety and Health Administration—Home, United States Department of Labor, https://web.archive.org/web/20120722160756/http://www.osha.gov/, accessed Jun. 13, 2021, 2 pages.
Office Action dated Apr. 10, 2018 in related U.S. Appl. No. 15/294,349.
Office Action dated Apr. 2, 2018 in related U.S. Appl. No. 15/183,387.
Office Action dated Jul. 25, 2018 in related U.S. Appl. No. 15/644,487.
Office Action dated May 29, 2018 in related U.S. Appl. No. 15/235,716.
Office Action dated Oct. 4, 2018 in related U.S. Appl. No. 15/217,081.
Office Action dated Aug. 19, 2019 in related U.S. Appl. No. 15/356,436.
Office Action dated Aug. 4, 2020 in related U.S. Appl. No. 16/385,070.
Office Action dated Dec. 12, 2018 in related U.S. Appl. No. 16/160,708.
Office Action dated Jan. 30, 2019 in related Canadian Patent Application No. 2,936,997.
Office Action dated Jun. 11, 2019 in corresponding U.S. Appl. No. 16/210,749.
Office Action dated Jun. 22, 2020 in relate U.S. Appl. No. 16/377,861.
Office Action dated Jun. 29, 2020 in related U.S. Appl. No. 16/404,283.
Office Action dated Jun. 29, 2020 in related U.S. Appl. No. 16/728,359.
Office Action dated Jun. 7, 2019 in corresponding U.S. Appl. No. 16/268,030.
Office Action dated Mar. 1, 2019 in related Canadian Patent Application No. 2,943,275.
Office Action dated May 10, 2019 in corresponding U.S. Appl. No. 16/268,030.
Office Action dated Oct. 11, 2019 in related U.S. Appl. No. 16/385,070.
Office Action dated Oct. 2, 2019 in related U.S. Appl. No. 16/152,732.
Office Action dated Sep. 11, 2019 in related U.S. Appl. No. 16/268,030.
Office Action dated Sep. 20, 2019 in related U.S. Appl. No. 16/443,273.
Office Action dated Sep. 3, 2019 in related U.S. Appl. No. 15/994,772.
Portfolio Media Inc., A Shift to Sand: Spotlight on Silica Use in Fracking, Law360, https://www.law360.com/articles/366057/print?section=energy, accessed Jun. 10, 2021, 5 pages.
Professional Publications, Inc., Books for FE, PE, FLS and PLS Exams, Spring 2004, http://www.ppi2pass.com/corner/catalog.pdf, 16 pages.
Project registration, Moxastore, http://www.moxastore.com, Feb. 15, 2015, 2 pages.
Pulsation Dampers, Coorstek, 2014, https://web.archive.org/web/20140919005733/http://coorstek.com/markets/energy_equip . . . , 2 pages.
R. Misty et al., "Induction Motor Vibrations in view of the API 541—4th Edition," IEEE, accessed Jun. 10, 2021, 10 pages.
Random House Webster's Unabridged Dictionary, Second Edition, 2001, p. 990.
Schlumberger, "Jet Manual 23, Fracturing Pump Units, SPF/SPS-343, Version 1.0" Jan. 31, 2007, 68 pages.
Society of Automotive Engineers, Sae J1292: Automobile, Truck, Truck-Tractor, Trailer, and Motor Coach Wiring, 49 CFR 393.28, Oct. 1981, 6 pages.
Stan Gibilisco, The Illustrated Dictionary of Electronics: Audio/Video Consumer Electronics Wireless Technology—Eighth Edition, 2001, p. 667.
Stephen Cary et al, "Electric Rotating Machine Standards Part II: Magnetic Wedge Design & Monitoring Methods," 2011 IEEE, Paper No. PCIC-2011-41, 8 pages.
Stewart & Stevenson, "Stimulation Systems," 2007, 20 pages.
Style W77 AGS Flexible Coupling, Victaulic Company 2015, https://web.archive.org/web/20150423052817/http://www.victaulic.com:80/en/products-services/products/style-w77-ags-f . . . , 1 page.
Testimony of Judge Paul R. Michel (Ret.) United Stated Court of Appeals for the Federal Circuit Before the Subcommittee on Intellectual Property, U.S. Senate committee on the Judiciary, Jun. 4, 2019, 8 pages.
"Kerr Pumps & FlowVale Awards for Excellence in Well Completion, Northeast 2017—Awarded to: U.S. Well Services, https://www.oilandgasawards.com/winner/noertheast-2017-kerr-pumps-flowvales-awards..", accessed Oct. 5, 2021, 4 pages.
"Petroleum Alumnus and Team Develop Mobile Fracturing Unit that Alleviates Environmental Impact," 2015, LSU, https://www.lsu.edu/eng/news/2015/07/20150713-mobile-fracturing-unit.php, accessed Sep. 22, 2021, 2 pages.
A.H. Bonnett et al., "Squirrel Cage Rotor Options for A.C. Induction Motors," IEEE, accessed May 18, 2021, 4 pages.
A.T. Dufresne, How reliable are trial dates relied on by the PTAB in the Fintiv analysis? Perkins Cole, 2021, 3 pages.
Affidavit of Duncan Hall, Internet Archives on Jun. 7, 2021, https://web.archive.org/web/20120917102614/http:/www.quincieoilfield.com/pdf/3.0%20Gardner%20Denver/2500/GD2500Q%200p%20&%20Service%20Manual.pdf, 76 pages.
Austin H. Bonnett, "Root Cause Failure Analysis for AC Induction Motors in the Petroleum and Chemical Industry," 2010, IEEE, Paper No. PCIC-2010-43, 13 pages.
Carolyn Davis "Natural Gas Finding Niche in E-Fracking, But Diesel Still Rules." Sep. 6, 2019, Natural Gas Intel, https://www.naturalgasintel.com/natural-gas-finding-niche-in-e-fracking-but-still-rules, 9 pages.
D. Bogh et al., "A User's Guide to Factory Testing of Large Motors: What Should Your Witness Expect," IEEE accessed Jun. 10, 2021, 8 pages.
Dani Kass, "Fintiv Fails: PTAB Uses 'Remarkably Inaccurate' Trail Dates," Nov. 2, 2021, Law 360, 1 page.
Declaration of Dr. Mark Ehsani, IPR2021-01066, Jul. 2, 2021, 213 pages.
Declaration of Robert Schaaf, IPR2021-01066, Nov. 17, 2021, 43 pages.
Elsevier, "Variable Speed Pumping—A Guide to Successful Applications," 2019, 186 pages.
Eugene A. Avallone et al., "Marks' Standard Handbook for Mechanical Engineers, 11th Edition," 2007, pp. 3-65, 14-2, 14-3,14-13, 14-14, 20-91, 22-12, 22-13, 22-14, 22-15, 22-16, 10-3, 20-21, 20-22, 20-85, 20-86, 20-89, and 20-90.
J. Malinowski et al., "Petrochemical Standards A Comparison Between IEEE 841-2001, API 541, and API 547," 2004, IEEE, Paper No. PCIC-2004-22, 8 pages.
*Kirsch Research and Development, LLC* v *Tarco Specialty Products, Inc.*, Case No. 6:20-cv-00318-ADA, Doc 62, Memorandum Opinion & Order Grant Defendant's Opposed Motion to Stay Pending inter Partes Review of the '482 Patent, Oct. 4, 2021, 6 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
New Technology Development Award—General/Products, Northeast 2015—Awarded to: U.S. Well Services, LLC, https://www.oilandgasawards.com/winner/northeast-2015-new-technology-development-award-generalproducts/#, accessed Aug. 23, 2021, 4 pages.
OSHA Publications, U.S. Department of Labor—Occupational Safety and Health Administration, https://web.archive.org/web/

(56) References Cited

OTHER PUBLICATIONS

20150406054914/https://www.osha.gov/pls/publications/publication. AthruZ?pType=Industry, Jun. 13, 2021, 3 pages.

Standing Order Governing Proceedings—Patent Cases, in the United States district Court for the Western District of Texas, Waco Division, filed Nov. 17, 2021, 11 pages.

Steven C. Carlson, Weaponizing IPRs, Landslide, Sep. 22, 2019, 10 pages.

T.W. Pascall et al., "Navigating the Test Requirements of API 541 4th Edition," 2007, IEEE, Paper No. PCIC-2007-11, 12 pages.

Tim Rahill and Micheal C. Fousha, "Sorting out the Overlap," Jan./Feb. 2009, IEEE Industry Applications Magazine, 12 pages.

Transcend Shipping Systems, LLC et al. Case Nos. 6:20-cv-1195-ADA, 6:21-cv-0018-ADA, and 6:21-cv-0040-ADA, Doc 19, Proposed Amended Scheduling Order, Aug. 13, 2021, 6 pages.

U.S. Well Services Investor and Analyst Update: Second Quarter 2021 in Review, 2021, 7 pages.

*U.S. Well Services, Inc.* v. *Halliburton Company*, Civil Docket for Case # 6:21-cv-00367-ADA, https://ecf.txwd.uscourts.gov/cgi-bin/DktRpt.pl?190912742001885-L_10_0-1, Accessed Nov. 29, 2021, 13 pages.

*U.S. Well Services, Inc., & U.S. Well Services, LLC* v *Halliburton Company, Cimarex Energy Co., Halliburton Energy Services, Inc., & Halliburton US Technologies, Inc.*, Case No. WA:21-CV-00367-ADA, Doc 61, Ordering Resetting Markman Hearing, Dec. 8, 2021, 1 page.

*U.S. Well Servies, Inc., and U.S. Well Services, LLC* v *Halliburton Company, Cimarex Energy Co., Halliburton Energy Services, Inc., and Halliburton US Technologies, Inc.*, Case No. WA:21-CV-00367-ADA, Doc 61, Order Setting Markman Hearing, Nov. 29, 2021, 1 page.

Liz Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.

""Growth in electric-fracking fleets stunted by tight producer budgets,"", Jodi Shafto, Aug. 6, 2019, S&P Global Market Intelligence, https://www.spglobal.com/marketintelligence/en/news-insights/latest-news-headlines/growth-in-electric-fracking-fleets-stunted-by-tight-producer-budgets, accessed Sep. 16, 2021, 4 pages.

""U.S. Well Services Issues $125.5 Million Convertible Senior Secured PIK Notes, Executes License Agreement with ProFrac Manufacturing, LLC and Finalizes Amendment to Senior Secured Term Loan,","", Jun. 28, 2021, https://finance.yahoo.com/news/u-well-services-issues-125-203000637.html?guccounter+1, 6 pages.

""VZ Environmental Award of Excellence in Environmental Stewardship, Rocky Mountain 2016—awarded to U.S. Well Services, LLC"", Oil & Gas Awards, 2016, https://www.oilandgasawards.com/winner/rocky-mountain-2016-vz-enviormental-award-for-excellence-in-wnviormental-stewardship, accessed Aug. 23, 2021, 4 pages.

"Amazon.com purchase page for Electrical engineering Reference Manual for the Electrical and computer PE Exam", Sixth Edition, https://web.archive.org/web/20070103124447/https:/www.amazon,com/Electrical-Engineering-Reference-Manual-Computer/dp/1888577568/, accessed Jul. 23, 2021, 7 pages.

"U.S. Well Services, Inc. files suit against Halliburton Company and Cimarex Energy Co. for patent infringement", Apr. 15, 2021, PR Newswire, https://www.prnewswire.com/news-releases/us-well-services-inc-files-suit-against-halliburton-comapny-and-climax-energy-co-for-patent-infringement-301270118.html, 2 pages.

Final Office Action issued in corresponding U.S. Appl. No. 14/622,532 dated Dec. 21, 2015.

Final Office Action issued in corresponding U.S. Appl. No. 14/622,532 dated Dec. 7, 2016.

Final Office Action issued in corresponding U.S. Appl. No. 15/145,491 dated Jan. 20, 2017.

Final Office Action issued in corresponding U.S. Appl. No. 15/145,491 dated Sep. 6, 2017.

Final Office Action issued in corresponding U.S. Appl. No. 15/294,349 dated Jul. 6, 2017.

Final Office Action dated Feb. 4, 2021 in U.S. Appl. No. 16/597,014.

Final Office Action dated Jan. 11, 2021 in U.S. Appl. No. 16/404,283.

Final Office Action dated Jan. 21, 2021 in U.S. Appl. No. 16/458,696.

Gardner Denver, 3" 1502 Male Hammer Union Discharge Flange, 2005, 13 pages.

Gardner Denver, Well Servicing Pump Model GD-2500Q Quintuplex—Operating and Service Manual, Aug. 2005, 46 pages.

Gardner Denver, Well Servicing Pump Model GD-2500Q, GD-2500Q-HD, Quintuplex Pumps, Sep. 2011, 45 pages.

Goodwin, "High-voltage auxiliary switchgear for power stations," Power Engineering Journal, 1989, 10 pg. (Year 1989).

Halliburton, Halliburton All-Electric Fracturing Reducing Emissions and Cost Brochure, 2021, 6 pages.

Hart Energy, Hydraulic Fracturing Techbook, 2015, 99 pages.

Hazard Alert—Worker exposure to Silica during Hydraulic Fracturing, United States Department of Labor, https://web.archive.org/web/20120808200919/http://www.osha.gov/dts/hazardalerts/hydraulic_frac_hazard_alert.html, accesed Jun. 13, 2021, 5 pages.

Henry Chajet, "OSHA Issues Alert on Non-Silica Fracking Hazards," Jan. 30, 2015, National Law Review Newsroom, 2 pages.

IEEE Authoritative Dictionary of IEEE Standards Terms Seventh Edition, 2000, 7 pages.

IEEE Power Engineering Society, 112 IEEE Standard Test Procedure for Polyphase Induction Motors and Generators, 2004, 87 pages.

Industrial Safety & Hygiene News, OSHA issues Hazard alert for fracking and drilling, Jan. 6, 2015, 1 page.

Industry/Hazard Alerts, United States Department of Labor, https://web.archive.org/web/20120801064838/http://www.osha.gov:80/hazardindex.html, accessed Jun. 13, 2021, 1 page.

International Search and Report and Written Opinion dated Jan. 2, 2019 in related PCT Patent Application No. PCT/US18/54542.

International Search and Written Opinion dated Aug. 28, 2020 in PCT/US20/23821.

International Search report and Written Opinion dated Sep. 19, 2018 in related PCT Patent Application No. PCT/US2018/040683.

International Search Report and Written Opinion issued in PCT/US2020/023809 dated Jun. 2, 2020.

International Search Report and Written Opinion dated Apr. 10, 2019 in corresponding PCT Application No. PCT/US2019/016635.

International Search Report and Written Opinion dated Dec. 14, 2020 in PCT/US2020/53980.

International Search Report and Written Opinion dated Dec. 31, 2018 in related PCT Patent Application No. PCT/US18/55913.

International Search Report and Written Opinion dated Feb. 15, 2019 in related PCT Application No. PCT/US18/63977.

International Search Report and Written Opinion dated Feb. 2, 2021 in PCT/US20/58906.

International Search Report and Written Opinion dated Feb. 3, 2021 in PCT/US20/58899.

International Search Report and Written Opinion dated Feb. 4, 2021 in PCT/US20/59834.

International Search Report and Written Opinion mailed in PCT/US/67526 dated May 6, 2021.

International Search Report and Written Opinion mailed in PCT/US20/67146 dated Mar. 29, 2021.

International Search Report and Written Opinion mailed in PCT/US20/67523 dated Mar. 22, 2021.

International Search Report and Written Opinion mailed in PCT/US20/67528 dated Mar. 19, 2021.

International Search Report and Written Opinion mailed in PCT/US20/67608 dated Mar. 30, 2021.

International Search Report and Written Opinion mailed in PCT/US2020/066543 dated May 11, 2021.

International Search Report and Written Opinion dated Jan. 2, 2019 in related PCT Patent Application No. PCT/US18/54548.

International Search Report and Written Opinion dated Jan. 2, 2020 in related PCT Application No. PCT/US19/55325.

International Search Report and Written Opinion dated Jan. 4, 2019 in related PCT Patent Application No. PCT/US18/57539.

(56) References Cited

OTHER PUBLICATIONS

International Search Report and Written Opinion dated Jul. 22, 2020 in corresponding PCT Application No. PCT/US20/00017.
International Search Report and Written Opinion dated Jul. 9, 2019 in corresponding PCT Application No. PCT/US2019/027584.
International Search Report and Written Opinion dated Jun. 23, 2020 in corresponding PCT Application No. PCT/US20/23912.
International Search Report and Written Opinion dated Mar. 5, 2019 in related PCT Application No. PCT/US18/63970.
International Search Report and Written Opinion dated Nov. 26, 2019 in related PCT Application No. PCT/US19/51018.
International Search Report and Written Opinion dated Sep. 11, 2019 in related PCT Application No. PCT/US2019/037493.
Thorndike Saville, The Victaulic Pipe Joint, Journal of American Water Works Association, Nov. 1922, vol. 9, No. 6, pp. 921-927.
*Transcend Shipping Systems LLC v Mediterranean Shipping Company S.A.*, Case No. 6:21-cv-00040, Doc 27, Order of Dismissal with Prejudice, Dec. 7, 2021, 1 page.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.
*U.S. Well Services, Inc and U.S. Well Services, LLC v Halliburton Company and Cimarex Energy Co.*, Case No. 6:21-CV-00367-ADA, Doc 56, Defendants' Opening Claim Construction Brief, Oct. 27, 2021, 46 pages.
*U.S. Well Services, Inc. and U.s Well Services, LLC v Halliburton Company and Cimarex Energy Co.*, Case No. 6:21-cv-00367-ADA, Defendants' preliminary Invalidity Contentions, Sep. 10, 2021, 193 pages.
*U.S. Well Services, Inc. and U.s Well Services, LLC v Halliburton Company and Cimarex Energy Co.*, Case No. 6:21-cv-00367-ADA, Document 1-8, Exhibit H, Halliburton—All Electric Fracturing Reducing Emissions and Cost, Apr. 15, 2021, 6 pages.
*U.S. Well Services, Inc. and U.s Well Services, LLC v Halliburton Company and Cimarex Energy Co.*, Case No. 6:21-cv-00367-ADA, Document 51, Agreed Scheduling Order, Sep. 16, 2021, 5 pages.
*U.S. Well Services, Inc. and U.s Well Services, LLC v Halliburton Company and Cimarex Energy Co.*, Case No. 6:21-cv-00367-ADA, Plaintiff U.S. Well Services, LLC's Disclosure of Extrinsic Evidence, Oct. 19, 2021, 10 pages.
*U.S. Well Services, Inc. and U.s Well Services, LLC v Halliburton Company and Cimarex Energy Co.*, Case No. 6:21-cv-00367-ADA, Plaintiff's Disclosure of Asserted Claims and Preliminary Infringement Contentions, Jul. 12, 2021, 9 pages.
*U.S. Well Services, Inc. v Halliburton Company*, Case No. 6:21-cv-00367-ADA, Civil Docket, accessed Dec. 13, 2021, 14 pages.
*U.S. Well Services, Inc. v Halliburton Company*, Case No. 6:21-cv-00367-ADA, Doc 64, Order Resetting Markman hearing, Dec. 8, 2021, 1 page.
*U.S. Well Services, Inc. v Halliburton Company*, Case No. 6:21-v-00367-ADA, Civil Docket, accessed Dec. 17, 2021, 14 pages.
*U.S. Well Services, LLC v Tops Well Services, LLC and Honghua America, LLC*, Case No. 3:19-cv-00237, Document 72, Plaintiff's Opening Claim Construction Brief, Apr. 24, 2020, 37 pages.
*U.S. Well Services, LLC v Tops Well Services, LLC and Honghua America, LLC*, Case No. 3:19-cv-00237, Document 72-9, Declaration of Dr. Robert Schaaf—part 2, Apr. 24, 2020, 128 pages.
*U.S. Well Services, LLC v Tops Well Services, LLC and Honghua America, LLC*, Case No. 3:19-cv-00237, Document 72-9, Declaration of Dr. Robert Schaaf—part 3, Apr. 24, 2020, 47 pages.
*U.S. Well Services, LLC v Tops Well Services, LLC and Honghua America, LLC*, Case No. 3:19-cv-00237, Document 72-9, Declaration of Dr. Robert Schaaf, Apr. 24, 2020, 52 pages.
*U.S. Well Services, LLC v Tops Well Services, LLC* Case No. 3:19-cv-237, Document 135, Order, Sep. 22, 2021, 2 pages.
*U.S. Well Services, LLC v Voltagrid LLC, Nathan Ough, Certarus (USA) Ltd., and Jared Oehring*, case No. 4:21-CV-3441-LHR, Doc 13, Plaintiff U.S. Well Services, LLC's Motion for Preliminary Injunction and Request for hearing, Nov. 4, 2021, 311 pages.

Victaulic Couplings Vibration Attenuation Characteristics, Victaulic, Publication 26.04, Oct. 2014, 5 pages.
Wire Rope Isolator Technologies, Enidine, Dec. 2011, 78 pages.
Woodbury et al., "Electrical Design Considerations for Drilling Rigs," IEEE Transactions on Industry Applications, vol. 1A-12, No. 4, Jul./Aug. 1976, pp. 421-431.
World's Best Swivel Joints, Flowvalve, 2013, https://web.archive.org/web/20150117041757/http://www.flowvalve.com:80/swivels, 10 pages.
Zeus Electric Pumping Unit, Halliburton, http://www.halliburton.com/en/products/zeus-electric-pumping-unit, 2021, 4 pages.
WIPO, International Search Report issued in Application No. PCT/US2018/063970 dated Mar. 5, 2019, 2 pages.
*U.S. Well Services, Inc. and U.S. Well Services, LLC v Halliburton Company and Cimarex Energy Co.*, Case No. 6:21-cv-00367-ADA, Document 63, Defendants' Claim Construction Brief in Reply to U.S. Well Services, LLC's Responsive Brief, Dec. 2, 2021, 30 pages.
*U.S. Well Services, LLC v Tops Well Services, LLC and Honghua America, LLC*, Case No. 3:19-cv-00237, Document 116, Hearing on Markman and Summary Judgment via Video Conference before the Honorable Andrew M. Edison Day 1 of 1 Day—Transcript, Jun. 15, 2020, 308 pages.
""Analysis of Vibration and Failure Problems in Reciprocating Triplex Pumps for Oil Pipelines,"", J.C. Wachel et al., The American Society of Mechanical Engineers, Presented at the Energysources and Technology Conference and Exhibition, Dallas, Texas, Feb. 17-21, 1985, 8 pages.
"Professional Publications, Inc., FE Exam, PE Exam, ARE Exam, and NCIDQ Exam Review / Professional Engineering Licensing, About PPI,", https://web.archive.org/web/20031219231426/http://ppi2pass.com:80/catalog/servlet/MyPpi_pg_aboutppi.html, accessed Jul. 22, 2021, 1 pages.
"Professional Publications, Inc., FE Exam, PE Exam, ARE Exam, and NCIDQ Exam Review / Professional Engineering Licensing, Electrical PE Exam Review Products", https://web.archive.org/web/20040214233851/http://ppi2pass.com:80/catalog/servlet/MyPpi_ct_ELECTRICAL_, accessed Jul. 19, 2021, 7 pages.
"Professional Publications, Inc., FE Exam, PE Exam, ARE Exam, and NCIDQ Exam Review / Professional Engineering Licensing, Homepage", https://web.archive.org/web.archive.org/web/20040209054901/http://ppi2pass.com:80/catalog/servlet/MyPpi, accessed Jul. 2021, 1 page.
"Professional Publications, Inc., FE Exam, PE Exam, ARE Exam, and NCIDQ Exam Review / Professional Engineering Licensing, Instructor's Corner", https://web.archive.org/web/20031219232547/http://ppi2pass.com:80/catalog/servlet/MyPpi_pg_corner-corner.html, accessed Jul. 19, 2021, 2 pages.
"Professional Publications, Inc., FE Exam, PE Exam, ARE Exam, and NCIDQ Exam Review / Professional Engineering Licensing, Instructor's Corner,", https://web.archive.org/web/20031219232547/http://ppi2pass.com:80/catalog/servlet/MyPpi_pg_corner-corner.htlm, accessed Jul. 19, 2021, 2 pages.
"Professional Publications, Inc., FE Exam, PE Exam, ARE Exam, and NCIDQ Exam Review / Professional Engineering Licensing, Teaching an Electrical and Computer Engineering PE Exam Review Course", https://web.archive.org/web/20031223100101/http:ppi2pass.com:80/catalog/servlet/MyPpi_pg_corner-teachee.html, accessed Jul. 19, 2021, 2 pages.
"Professional Publications, Inc., FE Exam, PE Exam, ARE Exam, and NCIDQ Exam Review / Professional Engineering Licensing, The PPI Online Catalog", https://web.archive.org/web/20040215142016/http://ppi2pass.com:80/catalog/servlet/MyPpi_ct_MAIN, accessed Jul. 19, 2021, 2 pages.
"Professional Publications, Inc., FE Exam, PE Exam, ARE Exam, and NCIDQ Exam Review / Professional Engineering Licensing, What PPI Customers Say,", https://web.archive.org/web/20031226130924/http://ppi2pass.com:80/catalog/servlet/MyPpi_pg_comments-EEcomments.html, accessed Jul. 22, 2021.
"Public Catalog of the U.S. Copyright Office for search result: electrical engineering reference manual", https://cocatalog.oc.gov/

(56) References Cited

OTHER PUBLICATIONS cgi-in/Pwebrecon.cgi?v1=6&ti=1, 6&Search_Arg=electrical engineering reference manual&search_code=TALL&CNT=25&PI . . . , accessed Jul. 21, 2021, 2 pages.

UK Power Networks, "Transformers to Supply Heat to Tate Modern", UK Power Networks, from press releases May 16, 2013.

International Search Report and Written Opinion dated Sep. 3, 2020 in PCT/US2020/36932.

Janice Hoppe-Spiers, "Deploying Change," Energy & Mining International, Spring 2017, http://www.emi-magazine.com, 5 pages.

Jim Harris, "U.S. Well Services LLC—Energy and Mining Magazine," Energy & Mining International, Oct. 12, 2021, https://www.emi-magazine.com/sections/profiles/1221-us-well-services-llc, 3 pages.

John A. Camera, PE, Electrical Engineering Reference Manual for the Electrical and Computer PE Exam, Sixth Edition, 2002, 102 pages.

John Daniel, "8.30 DEP Industry Observations: New Flac Fleet; New Fleet Designs Forthcoming," Daniel Energy Partners, Aug. 30, 2020, 13 pages.

Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).

Katsuhiko Ogata, Modern Control Engineering: Third Edition, 1997, 2 pages.

*Ledcomm LLC* v *Signify North America Corp., Signify Holding B.V., and Signify N.V.*, Case No. 6:20-cv-01056-ADA, Document 24, Scheduling Order, Aug. 13, 2021, 4 pages.

*LedComm LLC* v *Signify North America Corporation*, Case No. 6:20-cv-01056-ADA, Civil Docket, accessed Dec. 8, 2021, 11 pages.

Lionel B. Roe, Practices and Procedures of Industrial Electrical Design, 1972, McGraw-Hill, Inc., Chapter 2: The Basic Electric System, 11 pages.

Luis Gamboa, "Variable Frequency Drives in Oil and Gas Pumping Systems", Dec. 17, 2011, 5 pages.

M. E. Rahman et al., "Wire rope isolators for vibration isolation of equipment and structures—A review," IOP Conference Series Materials Science and Engineering, Apr. 2015, 12 pages.

M. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.

Maxwell James Clerk 1868, On Governors, proc. R. Soc. Lond., pp. 16270-16283.

Michael Quentin Morton, Unlocking the Earth: A Short History of Hydraulic Fracturing (2013), GeoExpro, vol. 10, No. 6, 5 pages.

Mike Soraghan, OSHA issues hazard alert for fracking and drilling, E&E, Dec. 10, 2014, 1 page.

Mohinder L. Nayyar, Piping Handbook Seventh Edition, McGraw-Hill Handbook, 2000, 77 pages.

Morris et al., U.S. Appl. No. 62/526,869; Hydration-Blender Transport and Electric Power Distribution for Fracturing Operation; Jun. 28, 2018; USPTO; see entire document.

Moxa 802.11 ethernet to Serial, Moxastore, http://www.moxastore.com/Moxa_802_11_Wi_Fi_Ethernet_to_Serial_s/587.html, May 24, 2016, 1 page.

National Electrical Manufacturers Association, NEMA ICS 61800-4 Adjustable Speed Electrical Power Drive Systems, Part 4: general requirements—rafting Specifications for A.C. Power Drive Systems above 1000 V a.c. and Not Exceeding 35 kV, 2004 22 pages.

Non-Final Office Action issued in corresponding U.S. Appl. No. 14/622,532 dated May 17, 2016.

Non-Final Action issued in corresponding U.S. Appl. No. 15/293,681 dated Feb. 16, 2017.

Non-Final Office Action issue din corresponding U.S. Appl. No. 15/291,842 dated Jan. 6, 2017.

Non-Final Office Action issued in corresponding U.S. Appl. No. 14/622,532 dated Aug. 5, 2015.

Non-Final Office Action issued in corresponding U.S. Appl. No. 14/884,363 dated Sep. 5, 2017.

Non-Final Office Action issued in corresponding U.S. Appl. No. 15/145,443 dated Feb. 7, 2017.

Non-Final Office Action issued in Corresponding U.S. Appl. No. 15/145,491 dated May 15, 2017.

Non-Final Office Action issued in corresponding U.S. Appl. No. 15/145,491 dated Sep. 12, 2016.

Non-Final Office Action issued in corresponding U.S. Appl. No. 15/217,040 dated Nov. 29, 2016.

Non-Final Office Action issued in corresponding U.S. Appl. No. 15/235,788 dated Dec. 14, 2016.

Non-Final Office Action issued in corresponding U.S. Appl. No. 15/294,349 dated Mar. 14, 2017.

Non-Final Office Action issued in corresponding U.S. Appl. No. 15/486,970 dated Jun. 22, 2017.

Non-Final Office Action issued in corresponding U.S. Appl. No. 15/487,656 dated Jun. 23, 2017.

Non-Final Office Action issued in corresponding U.S. Appl. No. 15/487,694 dated Jun. 26, 2017.

Non-Final Office Action issued in U.S. Appl. No. 14/881,525 dated Jul. 21, 2021.

Non-Final Office Action issued in U.S. Appl. No. 16/404,283 dated Jul. 21, 2021.

Non-Final Office Action issued in U.S. Appl. No. 16/871,928 dated Aug. 25, 2021.

Non-Final Office Action issued in U.S. Appl. No. 16/943,727 dated Aug. 3, 2021.

Non-Final Office Action issued in U.S. Appl. No. 14/881,535 dated May 20, 2020.

Non-Final Office Action issued in U.S. Appl. No. 15/145,443 dated May 8, 2020.

Non-Final Office Action issued in U.S. Appl. No. 16/458,696 dated May 22, 2020.

Non-Final Office Action dated Nov. 13, 2017 in related U.S. Appl. No. 15/644,487.

Non-Final Office Action dated Nov. 29, 2017 in related U.S. Appl. No. 15/145,414.

Non-Final Office Action dated Oct. 6, 2017 in related U.S. Appl. No. 14/881,535.

Non-Final Office action dated Aug. 31, 2020 in U.S. Appl. No. 16/167,083.

Non-Final Office Action dated Dec. 23, 2019 in related U.S. Appl. No. 16/597,008.

Non-Final Office Action dated Dec. 6, 2019 in related U.S. Appl. No. 16/564,186.

Non-final Office Action dated Feb. 12, 2019 in related U.S. Appl. No. 16/170,695.

Non-Final Office Action dated Feb. 25, 2019 in related U.S. Appl. No. 16/210,749.

Non-Final Office Action dated Jan. 10, 2020 in related U.S. Appl. No. 16/597,014.

Declaration of Dr. Robert Durham, IPR2021-01065, Jun. 18, 2021, 138 pages.

Declaration of Duncan Hall, Internet Archive, Oct. 26, 2021, http://web.archive.org/web/20140531134153/http://www.amazon.com/StarTech-NETRS2321E-RS-232-Serial-Ethernet/dp/B000YB0NOS, 43 pages.

Declaration of Duncan Hall, Jul. 23, 2021, https://web.archive.org/web/20031219231426/http://ppi2pass.com:80/catalog/servlet/MyPpi_pg_aboutppi.html, 12 pages.

Declaration of Joel N. Broussard, Case Nos. IPR2021-01032 & IPR2021-01033, Oct. 13, 2021, 9 pages.

Declaration of Joel N. Broussard, IPR2021-01034, IPR2021-01035, IPR2021-01036, and IPR2021-01037, Oct. 20, 2021, 11 pages.

Declaration of Joel N. Broussard, IPR2021-01038, Oct. 20, 2021, 11 pages.

Declaration of Joel N. Broussard, IPR2021-01065, Oct. 20, 2021, 11 pages.

Declaration of Nathaniel E. Frank-White, Internet Archive, Feb. 17, 2022, http://web.archive.org/web/20140329090440/http://www.enidline.com/pdffiles/WR_catalog_2012.pdf, 82 pages.

(56) References Cited

OTHER PUBLICATIONS

Declaration of Robert Durham, IPR2021-01315, Aug. 12, 2021, 209 pages.
Declaration of Robert Durham, IPR2021-01316, Aug. 13, 2021, 75 pages.
Declaration of Robert Durham, IPR2022-00074, Nov. 8, 2021, 177 pages.
Declaration of Robert Schaaf, Case Nos. IPR-2021-01032 and IPR2021-01033, Oct. 12, 2021, 45 pages.
Declaration of Robert Schaaf, IPR2021-01034, Oct. 20, 2021, 47 pages.
Declaration of Robert Schaaf, IPR2021-01035, Oct. 20, 2021, 51 pages.
Declaration of Robert Schaaf, IPR2021-01037, Oct. 20, 2021, 52 pages.
Declaration of Robert Schaaf, IPR2021-01038, Nov. 10, 2021, 40 pages.
Declaration of Robert Schaaf, IPR2021-01065, Nov. 10, 2021, 33 pages.
Declaration of Robert Schaaf, IPR2021-01238, Nov. 17, 2021, 38 pages.
Declaration of Robert Schaaf, IPR2021-01315, Nov. 19, 2021, 39 pages.
Declaration of Robert Schaaf, IPR2021-01316, Nov. 19, 2021, 33 pages.
Declaration of Robert Schaaf, IPR2021-01538, Dec. 28, 2021, 40 pages.
Declaration of Robert Schaaf, IPR2021-01539, Jan. 25, 2022, 37 pages.
Declaration of Robert Schaaf, IPR2022-00074, Feb. 17, 2022, 36 pages.
Declaration of Sylvia D. Hall-Ellis, IPR2022-00610, Feb. 28, 2022, 98 pages.
Declaration of Sylvia D. Hall-Ellis, Ph.D., Case Nos. IPR2021-01032, IPR2021-01033, and IPR2021-01034, Jun. 18, 2021, 173 pages.
Department of Transportation, Federal Motor Carrier Safety Administration, 49 CFR Parts 390, 392 and 393—Parts and Accessories Necessary for Safe Operation; General Amendments; final Rule, Federal Register, Aug. 15, 2005, vol. 70, No. 156, 49 pages.
Donald G. Fink, "Standard Handbook for Electrical Engineers—Thirteenth Edition," 1993, McGraw-Hill Inc., pp. 10-13, 20-21, 20-22, 20-85, 20-20, 20-89, 20-90, 20-91, 22-12, 22-13, 22-14, 22-15 and 22-16.
Dr. Nedelcut et al., "Online and Off-line Monitoring-Diagnosis System (MDS) for Power Transformers," IEEE, 2008 International Conference on Condition Monitoring and Diagnosis, Beijing, China, Apr. 21-24, 2008, 7 pages.
Email from Michael See on Jun. 10, 2021 regarding API-541 Fourt Edition: Public Availability, 2 pages.
Eugene A. Avallone, Marks' Standard Handbook for Mechanical Engineers: 11th Edition, 2007, p. 16-4 and 16-22.
Eugene A. Avallone, Marks' Standard Handbook for Mechanical Engineers: 11th Edition, 2007, Section 14, 18 pages.
U.S. Pat. No. 9,410,410, Excerpt—Response to Non-Final Office Action filed Feb. 3, 2016, 57 pages.
The American Heritage dictionary of the English Language, Fifth edition, Fiftieth Anniversary, 2018, p. 911.
Ryan Davis, "Albright Says He'll Very Rarely Put Cases On Hold For PTAB," Law 360, https://www.law360.com/articles/1381597/print?section=ip, May 11, 2021, 2 pages.
U.S. Department of Labor—Occupational Safety and Health Administration, Hazard Alert—Worker Exposure to Silica during Hydraulic Fracturing, 2012, 7 pages.
U.S. Department of Labor—Occupational Safety and Health Administration, Hydraulic Fracturing and Flowback Hazards Other than Respirable Silica, 2014, 27 pages.
UAE Ministry of Economy, Office Action issued in Application No. P6000843/2020 dated Dec. 13, 2023, 8 pages.

* cited by examiner

Plunger Critical Speed Calculations  Plunger Critical Speed = 32 in/sec (based on 120 rpm crankshaft speed on 8" stroke pump)
Plunger Maximum Speed = 40 in/sec (based on 150 rpm crankshaft speed on 8" stroke pump)

| | Pump Stroke (in.) | Volume per rev. (BBL) | | | Crankshaft rpm | | Discharge Rates, (BPM) at Critical Speed | | | Discharge Rates, (BPM) at Maximum Speed | | |
|---|---|---|---|---|---|---|---|---|---|---|---|---|
| | | Triplex | Quint | 9 Plunger | 13 Plunger | Critical | Maximum | Triplex | Quint | 9 Plunger | 13 Plunger | Triplex | Quint | 9 Plunger | 13 Plunger |

| | Pump Stroke (in.) | Triplex | Quint | 9 Plunger | 13 Plunger | Critical | Maximum | Triplex | Quint | 9 Plunger | 13 Plunger | Triplex | Quint | 9 Plunger | 13 Plunger |
|---|---|---|---|---|---|---|---|---|---|---|---|---|---|---|---|
| 2.75" Bore | 8 | 0.01496 | 0.02449 | 0.04408 | 0.06367 | 120.00 | 150.00 | | | | | | | | |
| | 9 | 0.01653 | 0.02755 | 0.04959 | 0.07163 | 106.67 | 133.33 | | | | | | | | |
| | 10 | 0.01837 | 0.03061 | 0.05510 | 0.07959 | 96.00 | 120.00 | | | | | | | | |
| | 11 | 0.02020 | 0.03367 | 0.06061 | 0.08754 | 87.27 | 109.09 | | | | | | | | |
| | 12 | 0.02204 | 0.03673 | 0.06612 | 0.09550 | 80.00 | 100.00 | | | | | | | | |
| | 13 | 0.02388 | 0.03979 | 0.07163 | 0.10346 | 73.85 | 92.31 | 1.76 | 2.94 | 5.29 | 7.64 | 2.20 | 3.67 | 6.61 | 9.55 |
| 3.0" Bore | 8 | 0.01794 | 0.02914 | 0.05246 | 0.07577 | 120.00 | 150.00 | | | | | | | | |
| | 9 | 0.01967 | 0.03279 | 0.05901 | 0.08524 | 106.67 | 133.33 | | | | | | | | |
| | 10 | 0.02186 | 0.03643 | 0.06557 | 0.09471 | 96.00 | 120.00 | | | | | | | | |
| | 11 | 0.02404 | 0.04007 | 0.07213 | 0.10419 | 87.27 | 109.09 | | | | | | | | |
| | 12 | 0.02623 | 0.04371 | 0.07869 | 0.11366 | 80.00 | 100.00 | | | | | | | | |
| | 13 | 0.02841 | 0.04736 | 0.08524 | 0.12313 | 73.85 | 92.31 | 2.10 | 3.50 | 6.29 | 9.09 | 2.62 | 4.37 | 7.87 | 11.37 |

FROM FIG. 4A

Plunger Critical Speed Calculations

Plunger Critical Speed = 32 in/sec (based on 120 rpm crankshaft speed on 8" stroke pump)
Plunger Maximum Speed = 40 in/sec (based on 150 rpm crankshaft speed on 8" stroke pump)

| | Pump Stroke (in.) | Volume per rev, (BBL) | | | Crankshaft rpm | | Discharge Rates, (BPM) at Critical Speed | | | Discharge Rates, (BPM) at Maximum Speed | | |
|---|---|---|---|---|---|---|---|---|---|---|---|---|
| | | Triplex | Quint | 9 Plunger | 13 Plunger | Critical | Maximum | Triplex | Quint | 9 Plunger | 13 Plunger | Triplex | Quint | 9 Plunger | 13 Plunger |
| 3.25" Bore | 8 | 0.02052 | 0.03420 | 0.06156 | 0.08839 | 120.00 | 150.00 | | | | | | | | |
| | 9 | 0.02309 | 0.03848 | 0.06926 | 0.10004 | 106.67 | 133.33 | | | | | | | | |
| | 10 | 0.02565 | 0.04275 | 0.07696 | 0.11116 | 96.00 | 120.00 | 2.46 | 4.10 | 7.39 | 10.67 | 3.08 | 5.13 | 9.23 | 13.34 |
| | 11 | 0.02822 | 0.04703 | 0.08465 | 0.12227 | 87.27 | 109.09 | | | | | | | | |
| | 12 | 0.03078 | 0.05130 | 0.09235 | 0.13339 | 80.00 | 100.00 | | | | | | | | |
| | 13 | 0.03335 | 0.05558 | 0.10004 | 0.14450 | 73.85 | 92.31 | | | | | | | | |
| 3.5" Bore | 8 | 0.02380 | 0.03967 | 0.07140 | 0.10313 | 120.00 | 150.00 | | | | | | | | |
| | 9 | 0.02677 | 0.04462 | 0.08032 | 0.11602 | 106.67 | 133.33 | | | | | | | | |
| | 10 | 0.02975 | 0.04958 | 0.08925 | 0.12892 | 96.00 | 120.00 | 2.86 | 4.76 | 8.57 | 12.38 | 3.57 | 5.95 | 10.71 | 15.47 |
| | 11 | 0.03272 | 0.05454 | 0.09817 | 0.14181 | 87.27 | 109.09 | | | | | | | | |
| | 12 | 0.03570 | 0.05950 | 0.10710 | 0.15470 | 80.00 | 100.00 | | | | | | | | |
| | 13 | 0.03867 | 0.06446 | 0.11602 | 0.16759 | 73.85 | 92.31 | | | | | | | | |

FROM FIG. 4B

Plunger Critical Speed Calculations

Plunger Critical Speed = 32 in/sec (based on 120 rpm crankshaft speed on 8" stroke pump)
Plunger Maximum Speed = 40 in/sec (based on 150 rpm crankshaft speed on 8" stroke pump)

| | Pump Stroke (in.) | Volume per rev, (BBL) | | | Crankshaft rpm | | Discharge Rates, (BPM) at Critical Speed | | | Discharge Rates, (BPM) at Maximum Speed | | |
|---|---|---|---|---|---|---|---|---|---|---|---|---|
| | | Triplex | Quint | 9 Plunger | 13 Plunger | Critical | Maximum | Triplex | Quint | 9 Plunger | 13 Plunger | Triplex | Quint | 9 Plunger | 13 Plunger |

| | Pump Stroke (in.) | Triplex | Quint | 9 Plunger | 13 Plunger | Critical | Maximum | Triplex | Quint | 9 Plunger | 13 Plunger | Triplex | Quint | 9 Plunger | 13 Plunger |
|---|---|---|---|---|---|---|---|---|---|---|---|---|---|---|---|
| 4.0" Bore | 8 | 0.03109 | 0.05181 | 0.09326 | 0.13470 | 120.00 | 150.00 | | | | | | | | |
| | 9 | 0.03497 | 0.05829 | 0.10491 | 0.15154 | 106.67 | 133.33 | | | | | | | | |
| | 10 | 0.03886 | 0.06476 | 0.11657 | 0.16838 | 96.00 | 120.00 | | | | | | | | |
| | 11 | 0.04274 | 0.07124 | 0.12823 | 0.18522 | 87.27 | 109.09 | | | | 16.16 | | | | |
| | 12 | 0.04663 | 0.07771 | 0.13989 | 0.20206 | 80.00 | 100.00 | | | 11.19 | | | | | |
| | 13 | 0.05051 | 0.08419 | 0.15154 | 0.21889 | 73.85 | 92.31 | 3.73 | 6.22 | | | 4.66 | 7.77 | 13.99 | 20.21 |
| 4.5" Bore | 8 | 0.03934 | 0.06557 | 0.11803 | 0.17049 | 120.00 | 150.00 | | | | | | | | |
| | 9 | 0.04426 | 0.07377 | 0.13278 | 0.19180 | 106.67 | 133.33 | | | | | | | | |
| | 10 | 0.04918 | 0.08196 | 0.14754 | 0.21311 | 96.00 | 120.00 | | | | 20.46 | | | | |
| | 11 | 0.05410 | 0.09016 | 0.16229 | 0.23442 | 87.27 | 109.09 | | | 14.16 | | | | | |
| | 12 | 0.05901 | 0.09836 | 0.17704 | 0.25573 | 80.00 | 100.00 | | | | | | | | |
| | 13 | 0.06393 | 0.10655 | 0.19180 | 0.27704 | 73.85 | 92.31 | 4.72 | 7.87 | | | 5.90 | 9.84 | 17.70 | 25.57 |

FROM FIG. 4C

Plunger Critical Speed Calculations

Plunger Critical Speed = 32 in/sec (based on 120 rpm crankshaft speed on 8" stroke pump)
Plunger Maximum Speed = 40 in/sec (based on 150 rpm crankshaft speed on 8" stroke pump)

| | Pump Stroke (in.) | Volume per rev, (BBL) | | | Crankshaft rpm | | Discharge Rates, (BPM) at Critical Speed | | | Discharge Rates, (BPM) at Maximum Speed | | |
|---|---|---|---|---|---|---|---|---|---|---|---|---|
| | | Triplex | Quint | 9 Plunger | 13 Plunger | Critical | Maximum | Triplex | Quint | 9 Plunger | 13 Plunger | Triplex | Quint | 9 Plunger | 13 Plunger |
| 5.0" Bore | 8 | 0.04857 | 0.08095 | 0.14571 | 0.21048 | 120.00 | 150.00 | | | | | | | | |
| | 9 | 0.05464 | 0.09107 | 0.16393 | 0.23678 | 106.67 | 133.33 | | | | | | | | |
| | 10 | 0.06071 | 0.10119 | 0.18214 | 0.26309 | 96.00 | 120.00 | 5.83 | 9.71 | 17.49 | 25.26 | 7.29 | 12.14 | 21.86 | 31.57 |
| | 11 | 0.06679 | 0.11131 | 0.20036 | 0.28940 | 87.27 | 109.09 | | | | | | | | |
| | 12 | 0.07286 | 0.12143 | 0.21857 | 0.31571 | 80.00 | 100.00 | | | | | | | | |
| | 13 | 0.07893 | 0.13155 | 0.19180 | 0.34202 | 73.85 | 92.31 | | | | | | | | |

FIG. 4D

| Transmission | |
|---|---|
| CAT TH55-E90 | Ratios |
| 1st Gear | 4.67 |
| 2nd Gear | 3.43 |
| 3rd Gear | 3.03 |
| 4th Gear | 2.53 |
| 5th Gear | 2.22 |
| 6th Gear | 1.85 |
| 7th Gear | 1.64 |
| 8th Gear | 1.36 |
| 9th Gear | 1.00 |

| Frac Pump | | |
|---|---|---|
| Fluid End Bore | Quint BBL/rev | |
| 4.0" | 0.05167 | |
| 4.5" | 0.06548 | |
| 5.0" | 0.08095 | |

CAT TH55-E90 Transmission - Quint Pumps 4.0" Fluid End

| | 1st Gear | | | 2nd Gear | | | 3rd Gear | |
|---|---|---|---|---|---|---|---|---|
| Engine rpm | Pump Crank rpm | Pump BPM | Engine rpm | Pump Crank rpm | Pump BPM | Engine rpm | Pump Crank rpm | Pump BPM |
| 1500 | 50.6 | 2.61 | 1500 | 68.8 | 3.56 | 1500 | 77.9 | 4.03 |
| 1550 | 52.2 | 2.70 | 1550 | 71.1 | 3.68 | 1550 | 80.5 | 4.16 |
| 1600 | 53.9 | 2.79 | 1600 | 73.4 | 3.79 | 1600 | 83.1 | 4.29 |
| 1650 | 55.6 | 2.87 | 1650 | 75.7 | 3.91 | 1650 | 85.7 | 4.43 |
| 1700 | 57.3 | 2.96 | 1700 | 78.0 | 4.03 | 1700 | 88.3 | 4.56 |
| 1750 | 59.0 | 3.05 | 1750 | 80.3 | 4.15 | 1750 | 90.9 | 4.70 |
| 1800 | 60.7 | 3.13 | 1800 | 82.6 | 4.27 | 1800 | 93.5 | 4.83 |
| 1850 | 62.4 | 3.22 | 1850 | 84.9 | 4.39 | 1850 | 96.1 | 4.97 |
| 1900 | 64.0 | 3.31 | 1900 | 87.2 | 4.51 | 1900 | 98.7 | 5.10 |
| 1950 | 65.7 | 3.40 | 1950 | 89.5 | 4.62 | 1950 | 101.3 | 5.23 |

4.5" Fluid End

| | 1st Gear | | | 2nd Gear | | | 3rd Gear | |
|---|---|---|---|---|---|---|---|---|
| Engine rpm | Pump Crank rpm | Pump BPM | Engine rpm | Pump Crank rpm | Pump BPM | Engine rpm | Pump Crank rpm | Pump BPM |
| 1500 | 50.6 | 3.31 | 1500 | 68.8 | 4.51 | 1500 | 77.9 | 5.10 |
| 1550 | 52.2 | 3.42 | 1550 | 71.1 | 4.66 | 1550 | 80.5 | 5.27 |
| 1600 | 53.9 | 3.53 | 1600 | 73.4 | 4.81 | 1600 | 83.1 | 5.44 |
| 1650 | 55.6 | 3.64 | 1650 | 75.7 | 4.96 | 1650 | 85.7 | 5.61 |
| 1700 | 57.3 | 3.75 | 1700 | 78.0 | 5.11 | 1700 | 88.3 | 5.78 |
| 1750 | 59.0 | 3.86 | 1750 | 80.3 | 5.26 | 1750 | 90.9 | 5.95 |
| 1800 | 60.7 | 3.97 | 1800 | 82.6 | 5.41 | 1800 | 93.5 | 6.12 |
| 1850 | 62.4 | 4.08 | 1850 | 84.9 | 5.56 | 1850 | 96.1 | 6.29 |
| 1900 | 64.0 | 4.19 | 1900 | 87.2 | 5.71 | 1900 | 98.7 | 6.46 |
| 1950 | 65.7 | 4.30 | 1950 | 89.5 | 5.86 | 1950 | 101.3 | 6.63 |

| Transmission | CAT TH55-E90 Ratios |
|---|---|
| 1st Gear | 4.67 |
| 2nd Gear | 3.43 |
| 3rd Gear | 3.03 |
| 4th Gear | 2.53 |
| 5th Gear | 2.22 |
| 6th Gear | 1.85 |
| 7th Gear | 1.64 |
| 8th Gear | 1.36 |
| 9th Gear | 1.00 |

| Frac Pump | |
|---|---|
| Fluid End Bore | Quint BBL/rev |
| 4.0" | 0.05167 |
| 4.5" | 0.06548 |
| 5.0" | 0.08095 |

CAT TH55-E90 Transmission - Quint Pumps

4.0" Fluid End Bore

| | 4th Gear | | | 5th Gear | | | 6th Gear | |
|---|---|---|---|---|---|---|---|---|
| Engine rpm | Pump Crank rpm | Pump BPM | Engine rpm | Pump Crank rpm | Pump BPM | Engine rpm | Pump Crank rpm | Pump BPM |
| 1500 | 93.3 | 4.82 | 1500 | 106.4 | 5.50 | 1500 | 127.6 | 6.59 |
| 1550 | 96.4 | 4.98 | 1550 | 109.9 | 5.68 | 1550 | 131.9 | 6.81 |
| 1600 | 99.5 | 5.14 | 1600 | 113.4 | 5.86 | 1600 | 136.1 | 7.03 |
| 1650 | 102.7 | 5.30 | 1650 | 117.0 | 6.04 | 1650 | 140.4 | 7.25 |
| 1700 | 105.8 | 5.46 | 1700 | 120.5 | 6.23 | 1700 | 144.6 | 7.47 |
| 1750 | 108.9 | 5.63 | 1750 | 124.1 | 6.41 | 1750 | 148.9 | 7.69 |
| 1800 | 112.0 | 5.79 | 1800 | 127.6 | 6.59 | 1800 | 153.2 | 7.91 |
| 1850 | 115.1 | 5.95 | 1850 | 131.2 | 6.78 | 1850 | 157.4 | 8.13 |
| 1900 | 118.2 | 6.11 | 1900 | 134.7 | 6.96 | 1900 | 161.7 | 8.35 |
| 1950 | 121.3 | 6.27 | 1950 | 138.3 | 7.14 | 1950 | 165.9 | 8.57 |

4.5" Fluid End Bore

| | 4th Gear | | | 5th Gear | | | 6th Gear | |
|---|---|---|---|---|---|---|---|---|
| Engine rpm | Pump Crank rpm | Pump BPM | Engine rpm | Pump Crank rpm | Pump BPM | Engine rpm | Pump Crank rpm | Pump BPM |
| 1500 | 93.3 | 6.11 | 1500 | 106.4 | 6.96 | 1500 | 127.6 | 8.36 |
| 1550 | 96.4 | 6.31 | 1550 | 109.9 | 7.20 | 1550 | 131.9 | 8.64 |
| 1600 | 99.5 | 6.52 | 1600 | 113.4 | 7.4 | 1600 | 136.1 | 8.9 |
| 1650 | 102.7 | 6.72 | 1650 | 117.0 | 7.7 | 1650 | 140.4 | 9.2 |
| 1700 | 105.8 | 6.93 | 1700 | 120.5 | 7.9 | 1700 | 144.6 | 9.5 |
| 1750 | 108.9 | 7.13 | 1750 | 124.1 | 8.12 | 1750 | 148.9 | 9.75 |
| 1800 | 112.0 | 7.33 | 1800 | 127.6 | 8.36 | 1800 | 153.2 | 10.03 |
| 1850 | 115.1 | 7.54 | 1850 | 131.2 | 8.59 | 1850 | 157.4 | 10.31 |
| 1900 | 118.2 | 7.74 | 1900 | 134.7 | 8.82 | 1900 | 161.7 | 10.59 |
| 1950 | 121.3 | 7.94 | 1950 | 138.3 | 9.5 | 1950 | 165.9 | 10.86 |

FIG. 5B

| Transmission | |
|---|---|
| CATTH55-E90 | Ratios |
| 1st Gear | 4.67 |
| 2nd Gear | 3.43 |
| 3rd Gear | 3.03 |
| 4th Gear | 2.53 |
| 5th Gear | 2.22 |
| 6th Gear | 1.85 |
| 7th Gear | 1.64 |
| 8th Gear | 1.36 |
| 9th Gear | 1.00 |

| Frac Pump | |
|---|---|
| Fluid End Bore | Quint BBL/rev |
| 4.0" | 0.05167 |
| 4.5" | 0.06548 |
| 5.0" | 0.08095 |

FROM FIG. 5A 5.0" Fluid End

| 1st Gear | | | | 2nd Gear | | | | 3rd Gear | | |
|---|---|---|---|---|---|---|---|---|---|---|
| Engine rpm | Pump Crank rpm | Pump BPM | | Engine rpm | Pump Crank rpm | Pump BPM | | Engine rpm | Pump Crank rpm | Pump BPM |
| 1500 | 50.6 | 4.09 | | 1500 | 68.8 | 5.57 | | 1500 | 77.9 | 6.31 |
| 1550 | 52.2 | 4.23 | | 1550 | 71.1 | 5.76 | | 1550 | 80.5 | 6.52 |
| 1600 | 53.9 | 4.37 | | 1600 | 73.4 | 5.94 | | 1600 | 83.1 | 6.73 |
| 1650 | 55.6 | 4.50 | | 1650 | 75.7 | 6.13 | | 1650 | 85.7 | 6.94 |
| 1700 | 57.3 | 4.64 | | 1700 | 78.0 | 6.32 | | 1700 | 88.3 | 7.15 |
| 1750 | 59.0 | 4.77 | | 1750 | 80.3 | 6.50 | | 1750 | 90.9 | 7.36 |
| 1800 | 60.7 | 4.91 | | 1800 | 82.6 | 6.69 | | 1800 | 93.5 | 7.57 |
| 1850 | 62.4 | 5.05 | | 1850 | 84.9 | 6.87 | | 1850 | 96.1 | 7.78 |
| 1900 | 64.0 | 5.18 | | 1900 | 87.2 | 7.06 | | 1900 | 98.7 | 7.99 |
| 1950 | 65.7 | 5.32 | | 1950 | 89.5 | 7.24 | | 1950 | 101.3 | 8.20 |

FROM FIG. 6A

Allison 9800 Transmission, Triplex Pumps

| TRIPLEX 5.0" | Engine rpm | Pump Crank rpm | Pump BPM | TRIPLEX 5.0" | Engine rpm | Pump Crank rpm | Pump BPM |
|---|---|---|---|---|---|---|---|
| 1st Gear | 1500 | 63.0 | 3.06 | 2nd Gear | 1500 | 87.8 | 4.26 |
| | 1550 | 65.1 | 3.16 | | 1550 | 90.7 | 4.40 |
| | 1600 | 67.2 | 3.26 | | 1600 | 93.6 | 4.55 |
| | 1650 | 69.3 | 3.36 | | 1650 | 96.6 | 4.69 |
| | 1700 | 71.4 | 3.46 | | 1700 | 99.5 | 4.83 |
| | 1750 | 73.5 | 3.57 | | 1750 | 102.4 | 4.97 |
| | 1800 | 75.6 | 3.67 | | 1800 | 105.3 | 5.11 |
| | 1850 | 77.7 | 3.77 | | 1850 | 108.3 | 5.26 |
| | 1900 | 79.8 | 3.87 | | 1900 | 111.2 | 5.40 |
| | 1950 | 81.9 | 3.97 | | 1950 | 114.1 | 5.54 |

TO FIG. 6D

| Transmission | |
|---|---|
| Allison 9800 Ratios | |
| 1st Gear | 3.75 |
| 2nd Gear | 2.69 |
| 3rd Gear | 2.20 |
| 4th Gear | 1.77 |
| 5th Gear | 1.58 |
| 6th Gear | 1.27 |
| 7th Gear | 1.00 |

| Frac Pump | |
|---|---|
| Fluid End Bore | Triplex BBL/rev |
| 4.0" | 0.03107 |
| 4.5" | 0.03933 |
| 5.0" | 0.04855 |

FIG. 6C

FROM FIG. 6B

Allison 980 Transmission, Triplex Pumps

| TRIPLEX 5.0" | Engine rpm | Pump Crank rpm | Pump BPM | TRIPLEX 5.0" | Engine rpm | Pump Crank rpm | Pump BPM |
|---|---|---|---|---|---|---|---|
| 3rd Gear | 1500 | 107.3 | 5.21 | 4th Gear | 1500 | 133.4 | 6.48 |
| | 1550 | 110.9 | 5.38 | | 1550 | 137.8 | 6.69 |
| | 1600 | 114.5 | 5.56 | | 1600 | 142.3 | 6.91 |
| | 1650 | 118.1 | 5.73 | | 1650 | 146.7 | 7.12 |
| | 1700 | 121.6 | 5.91 | | 1700 | 151.2 | 7.34 |
| | 1750 | 125.2 | 6.08 | | 1750 | 155.6 | 7.56 |
| | 1800 | 128.8 | 6.25 | | 1800 | 160.1 | 7.77 |
| | 1850 | 132.4 | 6.43 | | 1850 | 164.5 | 7.99 |
| | 1900 | 135.9 | 6.60 | | 1900 | 169.0 | 8.20 |
| | 1950 | 139.5 | 6.77 | | 1950 | 173.4 | 8.42 |

FROM FIG. 6C

| Transmission Allison 9800 Ratios | |
|---|---|
| 1st Gear | 3.75 |
| 2nd Gear | 2.69 |
| 3rd Gear | 2.20 |
| 4th Gear | 1.77 |
| 5th Gear | 1.58 |
| 6th Gear | 1.27 |
| 7th Gear | 1.00 |

| Frac Pump | |
|---|---|
| Fluid End Bore | Triplex BBL/rev |
| 4.0" | 0.03107 |
| 4.5" | 0.03933 |
| 5.0" | 0.04855 |

FIG. 6D

Allison 9800 Transmission, Quint Pumps

| Quint 4.0" | | Engine rpm | Pump Crank rpm | Pump BPM | Quint 4.0" | | Engine rpm | Pump Crank rpm | Pump BPM |
|---|---|---|---|---|---|---|---|---|---|
| Allison 9800 Transmission: 1st Gear | | 1500 | 63.0 | 3.25 | 2nd Gear | | 1500 | 87.8 | 4.54 |
| | | 1550 | 65.1 | 3.36 | | | 1550 | 90.7 | 4.69 |
| | | 1600 | 67.2 | 3.47 | | | 1600 | 93.6 | 4.84 |
| | | 1650 | 69.3 | 3.58 | | | 1650 | 96.6 | 4.99 |
| | | 1700 | 71.4 | 3.69 | | | 1700 | 99.5 | 5.14 |
| | | 1750 | 73.5 | 3.80 | | | 1750 | 102.4 | 5.29 |
| | | 1800 | 75.6 | 3.90 | | | 1800 | 105.3 | 5.44 |
| | | 1850 | 77.7 | 4.01 | | | 1850 | 108.3 | 5.59 |
| | | 1900 | 79.8 | 4.12 | | | 1900 | 111.2 | 5.74 |
| | | 1950 | 81.9 | 4.23 | | | 1950 | 114.1 | 5.90 |

TO FIG. 7B

| Quint 4.5" | | Engine rpm | Pump Crank rpm | Pump BPM | Quint 4.5" | | Engine rpm | Pump Crank rpm | Pump BPM |
|---|---|---|---|---|---|---|---|---|---|
| Allison 9800 Transmission: 1st Gear | | 1500 | 63.0 | 4.12 | 2nd Gear | | 1500 | 87.8 | 5.75 |
| | | 1550 | 65.1 | 4.26 | | | 1550 | 90.7 | 5.94 |
| | | 1600 | 67.2 | 4.40 | | | 1600 | 93.6 | 6.13 |
| | | 1650 | 69.3 | 4.54 | | | 1650 | 96.6 | 6.32 |
| | | 1700 | 71.4 | 4.67 | | | 1700 | 99.5 | 6.51 |
| | | 1750 | 73.5 | 4.81 | | | 1750 | 102.4 | 6.71 |
| | | 1800 | 75.6 | 4.95 | | | 1800 | 105.3 | 6.90 |
| | | 1850 | 77.7 | 5.08 | | | 1850 | 108.3 | 7.09 |
| | | 1900 | 79.8 | 5.22 | | | 1900 | 111.2 | 7.28 |
| | | 1950 | 81.9 | 5.36 | | | 1950 | 114.1 | 7.47 |

| Transmission Allison 9800 Ratios | |
|---|---|
| 1st Gear | 3.75 |
| 2nd Gear | 2.69 |
| 3rd Gear | 2.20 |
| 4th Gear | 1.77 |
| 5th Gear | 1.58 |
| 6th Gear | 1.27 |
| 7th Gear | 1.00 |

| Frac Pump | |
|---|---|
| Fluid End Bore | Triplex BBL/rev |
| 4.0" | 0.05167 |
| 4.5" | 0.06548 |
| 5.0" | 0.08095 |

Allison 9800 Transmission, Quint Pumps

| Quint 4.0" | Engine rpm | Pump Crank rpm | Pump BPM | Quint 4.0" | Engine rpm | Pump Crank rpm | Pump BPM |
|---|---|---|---|---|---|---|---|
| 3rd Gear | 1500 | 107.3 | 5.55 | 4th Gear | 1500 | 133.4 | 6.89 |
| | 1550 | 110.9 | 5.73 | | 1550 | 137.8 | 7.12 |
| | 1600 | 114.5 | 5.92 | | 1600 | 142.3 | 7.35 |
| | 1650 | 118.1 | 6.10 | | 1650 | 146.7 | 7.58 |
| | 1700 | 121.6 | 6.28 | | 1700 | 151.2 | 7.81 |
| | 1750 | 125.2 | 6.47 | | 1750 | 155.6 | 8.04 |
| | 1800 | 128.8 | 6.65 | | 1800 | 160.1 | 8.27 |
| | 1850 | 132.4 | 6.84 | | 1850 | 164.5 | 8.50 |
| | 1900 | 135.9 | 7.02 | | 1900 | 169.0 | 8.73 |
| | 1950 | 139.5 | 7.21 | | 1950 | 173.4 | 8.96 |

| Quint 4.5" | Engine rpm | Pump Crank rpm | Pump BPM | Quint 4.5" | Engine rpm | Pump Crank rpm | Pump BPM |
|---|---|---|---|---|---|---|---|
| 3rd Gear | 1500 | 107.3 | 7.03 | 4th Gear | 1500 | 133.4 | 8.73 |
| | 1550 | 110.9 | 7.26 | | 1550 | 137.8 | 9.03 |
| | 1600 | 114.5 | 7.50 | | 1600 | 142.3 | 9.32 |
| | 1650 | 118.1 | 7.73 | | 1650 | 146.7 | 9.61 |
| | 1700 | 121.6 | 7.96 | | 1700 | 151.2 | 9.90 |
| | 1750 | 125.2 | 8.20 | | 1750 | 155.6 | 10.19 |
| | 1800 | 128.8 | 8.43 | | 1800 | 160.1 | 10.48 |
| | 1850 | 132.4 | 8.67 | | 1850 | 164.5 | 10.77 |
| | 1900 | 135.9 | 8.90 | | 1900 | 169.0 | 11.06 |
| | 1950 | 139.5 | 9.14 | | 1950 | 173.4 | 11.35 |

FROM FIG. 7A
TO FIG. 7D

FIG. 7B

| Transmission | |
|---|---|
| Allison 9800 | Ratios |
| 1st Gear | 3.75 |
| 2nd Gear | 2.69 |
| 3rd Gear | 2.20 |
| 4th Gear | 1.77 |
| 5th Gear | 1.58 |
| 6th Gear | 1.27 |
| 7th Gear | 1.00 |

| Frac Pump | |
|---|---|
| Fluid End Bore | Triplex BBL/rev |
| 4.0" | 0.05167 |
| 4.5" | 0.06548 |
| 5.0" | 0.08095 |

Allison 9800 Transmission, Quint Pumps

| Quint 5.0" | | | | Engine rpm | Pump Crank rpm | Pump BPM | Quint 5.0" | | Engine rpm | Pump Crank rpm | Pump BPM |
|---|---|---|---|---|---|---|---|---|---|---|---|
| | | | | 1500 | 63.0 | 5.10 | | | 1500 | 87.8 | 7.11 |
| | | | | 1550 | 65.1 | 5.27 | | | 1550 | 90.7 | 7.34 |
| | | | | 1600 | 67.2 | 5.44 | | | 1600 | 93.6 | 7.58 |
| | | | | 1650 | 69.3 | 5.61 | | | 1650 | 96.6 | 7.82 |
| | | | | 1700 | 71.4 | 5.78 | | | 1700 | 99.5 | 8.05 |
| | | | | 1750 | 73.5 | 5.95 | | | 1750 | 102.4 | 8.29 |
| | | | | 1800 | 75.6 | 6.12 | | | 1800 | 105.3 | 8.53 |
| | | | | 1850 | 77.7 | 6.29 | | | 1850 | 108.3 | 8.76 |
| | | | | 1900 | 79.8 | 6.46 | | | 1900 | 111.2 | 9.00 |
| | | | | 1950 | 81.9 | 6.63 | | | 1950 | 114.1 | 9.24 |

Allison 9800 Transmission: 1st Gear — 2nd Gear

| Transmission | Allison 9800 Ratios |
|---|---|
| 1st Gear | 3.75 |
| 2nd Gear | 2.69 |
| 3rd Gear | 2.20 |
| 4th Gear | 1.77 |
| 5th Gear | 1.58 |
| 6th Gear | 1.27 |
| 7th Gear | 1.00 |

| Frac Pump | | |
|---|---|---|
| Fluid End Bore | Triplex BBL/rev | |
| 4.0" | 0.05167 | |
| 4.5" | 0.06548 | |
| 5.0" | 0.08095 | |

FROM FIG. 7A
TO FIG. 7D

FROM FIG. 7B

Allison 9800 Transmission, Triplex Pumps

| Quint 5.0" | Engine rpm | Pump Crank rpm | Pump BPM | Quint 5.0" | Engine rpm | Pump Crank rpm | Pump BPM |
|---|---|---|---|---|---|---|---|
| | 1500 | 107.3 | 8.69 | | 1500 | 133.4 | 10.80 |
| | 1550 | 110.9 | 8.98 | | 1550 | 137.8 | 11.16 |
| | 1600 | 114.5 | 9.27 | | 1600 | 142.3 | 11.52 |
| | 1650 | 118.1 | 9.56 | | 1650 | 146.7 | 11.88 |
| | 1700 | 121.6 | 9.85 | | 1700 | 151.2 | 12.24 |
| | 1750 | 125.2 | 10.14 | | 1750 | 155.6 | 12.60 |
| | 1800 | 128.8 | 10.43 | | 1800 | 160.1 | 12.96 |
| | 1850 | 132.4 | 10.71 | | 1850 | 164.5 | 13.32 |
| | 1900 | 135.9 | 11.00 | | 1900 | 169.0 | 13.68 |
| | 1950 | 139.5 | 11.29 | | 1950 | 173.4 | 14.04 |
| 3rd Gear | | | | 4th Gear | | | |

FROM FIG. 7C

| Transmission | |
|---|---|
| Allison 9800 Ratios | |
| 1st Gear | 3.75 |
| 2nd Gear | 2.69 |
| 3rd Gear | 2.20 |
| 4th Gear | 1.77 |
| 5th Gear | 1.58 |
| 6th Gear | 1.27 |
| 7th Gear | 1.00 |

| Frac Pump | |
|---|---|
| Fluid End Bore | Triplex BBL/rev |
| 4.0" | 0.05167 |
| 4.5" | 0.06548 |
| 5.0" | 0.08095 |

CAT THSS-E70 Transmission, Triplex Pumps

| TRIPLEX 4.0" | Engine rpm | Pump Crank rpm | Pump BPM | TRIPLEX 4.0" | Engine rpm | Pump Crank rpm | Pump BPM |
|---|---|---|---|---|---|---|---|
| CAT TH55-E70 Transmission 1st Gear | 1500 | 37.8 | 1.17 | 2nd Gear | 1500 | 51.4 | 1.60 |
| | 1550 | 39.0 | 1.21 | | 1550 | 53.2 | 1.65 |
| | 1600 | 40.3 | 1.25 | | 1600 | 54.9 | 1.70 |
| | 1650 | 41.6 | 1.29 | | 1650 | 56.6 | 1.76 |
| | 1700 | 42.8 | 1.33 | | 1700 | 58.3 | 1.81 |
| | 1750 | 44.1 | 1.37 | | 1750 | 60.0 | 1.86 |
| | 1800 | 45.3 | 1.41 | | 1800 | 61.7 | 1.92 |
| | 1850 | 46.6 | 1.45 | | 1850 | 63.4 | 1.97 |
| | 1900 | 47.9 | 1.49 | | 1900 | 65.2 | 2.02 |
| | 1950 | 49.1 | 1.53 | | 1950 | 66.9 | 2.08 |

| TRIPLEX 4.5" | Engine rpm | Pump Crank rpm | Pump BPM | TRIPLEX 4.5" | Engine rpm | Pump Crank rpm | Pump BPM |
|---|---|---|---|---|---|---|---|
| CAT TH55-E70 Transmission 1st Gear | 1500 | 37.8 | 1.49 | 2nd Gear | 1500 | 51.4 | 2.02 |
| | 1550 | 39.0 | 1.54 | | 1550 | 53.2 | 2.09 |
| | 1600 | 40.3 | 1.58 | | 1600 | 54.9 | 2.16 |
| | 1650 | 41.6 | 1.63 | | 1650 | 56.6 | 2.23 |
| | 1700 | 42.8 | 1.68 | | 1700 | 58.3 | 2.29 |
| | 1750 | 44.1 | 1.73 | | 1750 | 60.0 | 2.36 |
| | 1800 | 45.3 | 1.78 | | 1800 | 61.7 | 2.43 |
| | 1850 | 46.6 | 1.83 | | 1850 | 63.4 | 2.50 |
| | 1900 | 47.9 | 1.88 | | 1900 | 65.2 | 2.56 |
| | 1950 | 49.1 | 1.93 | | 1950 | 66.9 | 2.63 |

TO FIG. 8B
TO FIG. 8C

| Transmission CAT TH55-E70 Ratios | |
|---|---|
| 1st Gear | 6.25 |
| 2nd Gear | 4.59 |
| 3rd Gear | 3.38 |
| 4th Gear | 2.48 |
| 5th Gear | 1.83 |
| 6th Gear | 1.36 |
| 7th Gear | 1.00 |

| Frac Pump | |
|---|---|
| Fluid End Bore | Triplex BBL/rev |
| 4.0" | 0.03107 |
| 4.5" | 0.03933 |
| 5.0" | 0.04855 |

FIG. 8A

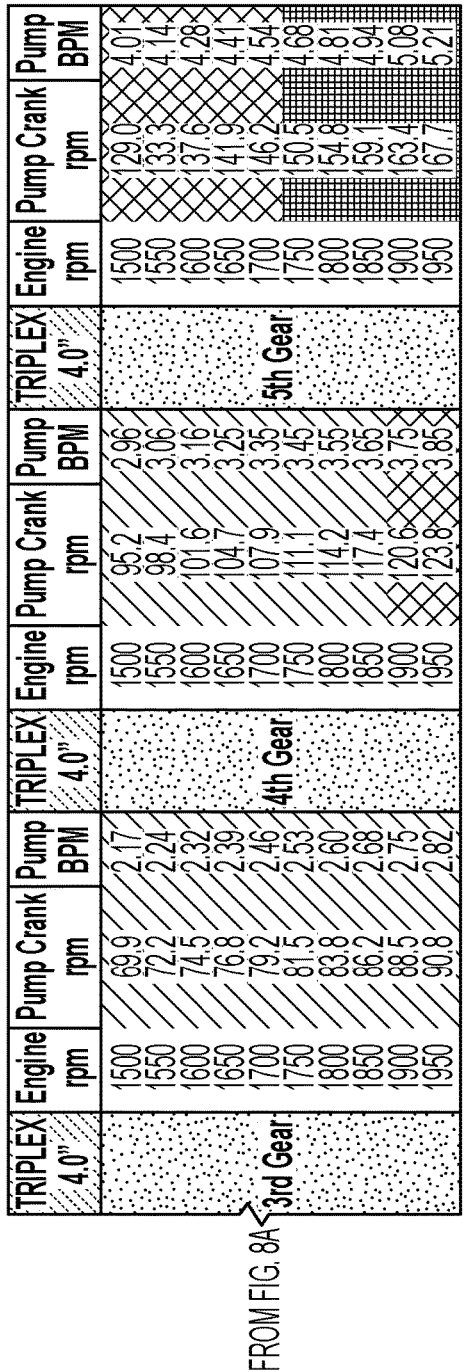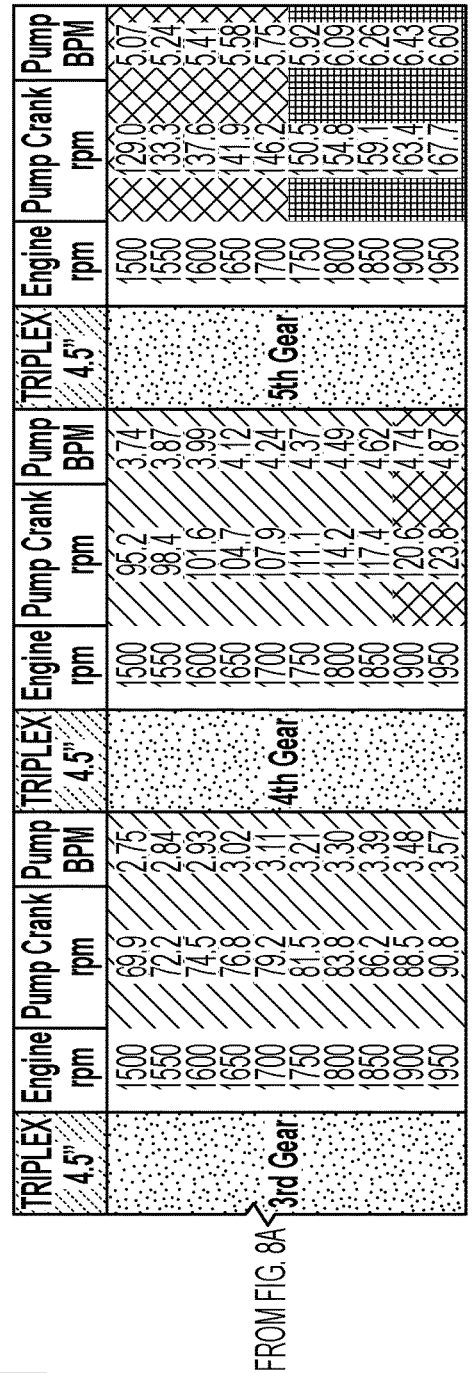
FIG. 8B

FROM FIG. 8A

| Transmission | |
|---|---|
| CAT TH55-E70 Ratios | |
| 1st Gear | 6.25 |
| 2nd Gear | 4.59 |
| 3rd Gear | 3.38 |
| 4th Gear | 2.48 |
| 5th Gear | 1.83 |
| 6th Gear | 1.36 |
| 7th Gear | 1.00 |

| Frac Pump | Triplex |
|---|---|
| Fluid End Bore | BBL/rev |
| 4.0" | 0.03107 |
| 4.5" | 0.03933 |
| 5.0" | 0.04855 |

CAT THSS-E70 Transmission, Triplex Pumps

| TRIPLEX 5.0" | Engine rpm | Pump Crank rpm | Pump BPM | TRIPLEX 5.0" | Engine rpm | Pump Crank rpm | Pump BPM |
|---|---|---|---|---|---|---|---|
| CAT TH55-E70 Transmission 1st Gear | 1500 | 37.8 | 1.83 | 2nd Gear | 1500 | 51.4 | 2.50 |
| | 1550 | 39.0 | 1.90 | | 1550 | 53.2 | 2.58 |
| | 1600 | 40.3 | 1.96 | | 1600 | 54.9 | 2.66 |
| | 1650 | 41.6 | 2.02 | | 1650 | 56.6 | 2.75 |
| | 1700 | 42.8 | 2.08 | | 1700 | 58.3 | 2.83 |
| | 1750 | 44.1 | 2.14 | | 1750 | 60.0 | 2.91 |
| | 1800 | 45.3 | 2.20 | | 1800 | 61.7 | 3.00 |
| | 1850 | 46.6 | 2.26 | | 1850 | 63.4 | 3.08 |
| | 1900 | 47.9 | 2.32 | | 1900 | 65.2 | 3.16 |
| | 1950 | 49.1 | 2.38 | | 1950 | 66.9 | 3.25 |

FROM FIG. 8B

CAT THSS-E70 Transmission, Triplex Pumps

| TRIPLEX 5.0" | Engine rpm | Pump Crank rpm | Pump BPM | TRIPLEX 5.0" | Engine rpm | Pump Crank rpm | Pump BPM | TRIPLEX 5.0" | Engine rpm | Pump Crank rpm | Pump BPM |
|---|---|---|---|---|---|---|---|---|---|---|---|
| 3rd Gear | 1500 | | | 4th Gear | 1500 | 69.9 | 3.39 | 5th Gear | 1500 | 95.2 | 4.62 |
| | 1550 | | | | 1550 | 72.2 | 3.50 | | 1550 | 98.4 | 4.78 |
| | 1600 | | | | 1600 | 74.5 | 3.62 | | 1600 | 101.6 | 4.93 |
| | 1650 | | | | 1650 | 76.8 | 3.73 | | 1650 | 104.7 | 5.08 |
| | 1700 | | | | 1700 | 79.2 | 3.84 | | 1700 | 107.9 | 5.24 |
| | 1750 | | | | 1750 | 81.5 | 3.96 | | 1750 | 111.1 | 5.39 |
| | 1800 | | | | 1800 | 83.8 | 4.07 | | 1800 | 114.2 | 5.55 |
| | 1850 | | | | 1850 | 86.2 | 4.18 | | 1850 | 117.4 | 5.70 |
| | 1900 | | | | 1900 | 88.5 | 4.30 | | 1900 | 120.6 | 5.85 |
| | 1950 | | | | 1950 | 90.8 | 4.41 | | 1950 | 123.8 | 6.01 |

FROM FIG. 8C

| Engine rpm | Pump Crank rpm | Pump BPM |
|---|---|---|
| 1500 | 129.0 | 6.26 |
| 1550 | 133.3 | 6.47 |
| 1600 | 137.6 | 6.68 |
| 1650 | 141.9 | 6.89 |
| 1700 | 146.2 | 7.10 |
| 1750 | 150.5 | 7.31 |
| 1800 | 154.8 | 7.52 |
| 1850 | 159.1 | 7.73 |
| 1900 | 163.4 | 7.93 |
| 1950 | 167.7 | 8.14 |

| Transmission | |
|---|---|
| CAT TH55-E70 Ratios | |
| 1st Gear | 6.25 |
| 2nd Gear | 4.59 |
| 3rd Gear | 3.38 |
| 4th Gear | 2.48 |
| 5th Gear | 1.83 |
| 6th Gear | 1.36 |
| 7th Gear | 1.00 |

| Frac Pump | |
|---|---|
| Fluid End Bore | Triplex BBL/rev |
| 4.0" | 0.03107 |
| 4.5" | 0.03933 |
| 5.0" | 0.04855 |

FIG. 8D

CAT THSS-E70 Transmission, Quint Pumps

Quint 4.0"

| | Engine rpm | Pump Crank rpm | Pump BPM |
|---|---|---|---|
| CAT TH55-E70 Transmission 1st Gear | | | |
| 2nd Gear | 1500 | 37.8 | 1.95 |
| 2nd Gear | 1550 | 39.0 | 2.02 |
| 2nd Gear | 1600 | 40.3 | 2.08 |
| 2nd Gear | 1650 | 41.6 | 2.15 |
| 2nd Gear | 1700 | 42.8 | 2.21 |
| 2nd Gear | 1750 | 44.1 | 2.28 |
| 2nd Gear | 1800 | 45.3 | 2.34 |
| 2nd Gear | 1850 | 46.6 | 2.41 |
| 2nd Gear | 1900 | 47.9 | 2.47 |
| 2nd Gear | 1950 | 49.1 | 2.54 |

| | Engine rpm | Pump Crank rpm | Pump BPM |
|---|---|---|---|
| 2nd Gear | 1500 | 51.4 | 2.66 |
| 2nd Gear | 1550 | 53.2 | 2.75 |
| 2nd Gear | 1600 | 54.9 | 2.84 |
| 2nd Gear | 1650 | 56.6 | 2.92 |
| 2nd Gear | 1700 | 58.3 | 3.01 |
| 2nd Gear | 1750 | 60.0 | 3.10 |
| 2nd Gear | 1800 | 61.7 | 3.19 |
| 2nd Gear | 1850 | 63.4 | 3.28 |
| 2nd Gear | 1900 | 65.2 | 3.37 |
| 2nd Gear | 1950 | 66.9 | 3.46 |

TO FIG. 9B

Quint 4.5"

| | Engine rpm | Pump Crank rpm | Pump BPM |
|---|---|---|---|
| CAT TH55-E70 Transmission 1st Gear | | | |
| 2nd Gear | 1500 | 37.8 | 2.47 |
| 2nd Gear | 1550 | 39.0 | 2.56 |
| 2nd Gear | 1600 | 40.3 | 2.64 |
| 2nd Gear | 1650 | 41.6 | 2.72 |
| 2nd Gear | 1700 | 42.8 | 2.80 |
| 2nd Gear | 1750 | 44.1 | 2.89 |
| 2nd Gear | 1800 | 45.3 | 2.97 |
| 2nd Gear | 1850 | 46.6 | 3.05 |
| 2nd Gear | 1900 | 47.9 | 3.13 |
| 2nd Gear | 1950 | 49.1 | 3.22 |

| | Engine rpm | Pump Crank rpm | Pump BPM |
|---|---|---|---|
| 2nd Gear | 1500 | 51.4 | 3.37 |
| 2nd Gear | 1550 | 53.2 | 3.48 |
| 2nd Gear | 1600 | 54.9 | 3.59 |
| 2nd Gear | 1650 | 56.6 | 3.71 |
| 2nd Gear | 1700 | 58.3 | 3.82 |
| 2nd Gear | 1750 | 60.0 | 3.93 |
| 2nd Gear | 1800 | 61.7 | 4.04 |
| 2nd Gear | 1850 | 63.4 | 4.15 |
| 2nd Gear | 1900 | 65.2 | 4.27 |
| 2nd Gear | 1950 | 66.9 | 4.38 |

Transmission CAT TH55-E70 Ratios

| Gear | Ratio |
|---|---|
| 1st Gear | 6.25 |
| 2nd Gear | 4.59 |
| 3rd Gear | 3.38 |
| 4th Gear | 2.48 |
| 5th Gear | 1.83 |
| 6th Gear | 1.36 |
| 7th Gear | 1.00 |

Frac Pump

| Fluid End Bore | Triplex BBL/rev |
|---|---|
| 4.0" | 0.05167 |
| 4.5" | 0.06548 |
| 5.0" | 0.08095 |

FIG. 9A

CAT THSS-E70 Transmission, Quint Pumps

| Quint 4.0" | Engine rpm | Pump Crank rpm | Pump BPM | Quint 4.0" | Engine rpm | Pump Crank rpm | Pump BPM | Quint 4.0" | Engine rpm | Pump Crank rpm | Pump BPM |
|---|---|---|---|---|---|---|---|---|---|---|---|
| 3rd Gear | 1500 | 69.9 | 3.61 | 4th Gear | 1500 | 95.2 | 4.92 | 5th Gear | 1500 | 129.0 | 6.67 |
|  | 1550 | 72.2 | 3.73 |  | 1550 | 98.4 | 5.08 |  | 1550 | 133.3 | 6.89 |
|  | 1600 | 74.5 | 3.85 |  | 1600 | 101.6 | 5.25 |  | 1600 | 137.6 | 7.11 |
|  | 1650 | 76.8 | 3.97 |  | 1650 | 104.7 | 5.41 |  | 1650 | 141.9 | 7.33 |
|  | 1700 | 79.2 | 4.09 |  | 1700 | 107.9 | 5.58 |  | 1700 | 146.2 | 7.56 |
|  | 1750 | 81.5 | 4.21 |  | 1750 | 111.1 | 5.74 |  | 1750 | 150.5 | 7.78 |
|  | 1800 | 83.8 | 4.33 |  | 1800 | 114.2 | 5.90 |  | 1800 | 154.8 | 8.00 |
|  | 1850 | 86.2 | 4.45 |  | 1850 | 117.4 | 6.07 |  | 1850 | 159.1 | 8.22 |
|  | 1900 | 88.5 | 4.57 |  | 1900 | 120.6 | 6.23 |  | 1900 | 163.4 | 8.44 |
|  | 1950 | 90.8 | 4.69 |  | 1950 | 123.8 | 6.40 |  | 1950 | 167.7 | 8.67 |

| Quint 4.5" | Engine rpm | Pump Crank rpm | Pump BPM | Quint 4.5" | Engine rpm | Pump Crank rpm | Pump BPM | Quint 4.5" | Engine rpm | Pump Crank rpm | Pump BPM |
|---|---|---|---|---|---|---|---|---|---|---|---|
| 3rd Gear | 1500 | 69.9 | 4.57 | 4th Gear | 1500 | 95.2 | 6.23 | 5th Gear | 1500 | 129.0 | 8.45 |
|  | 1550 | 72.2 | 4.73 |  | 1550 | 98.4 | 6.44 |  | 1550 | 133.3 | 8.73 |
|  | 1600 | 74.5 | 4.88 |  | 1600 | 101.6 | 6.65 |  | 1600 | 137.6 | 9.0 |
|  | 1650 | 76.8 | 5.03 |  | 1650 | 104.7 | 6.86 |  | 1650 | 141.9 | 9.3 |
|  | 1700 | 79.2 | 5.18 |  | 1700 | 107.9 | 7.07 |  | 1700 | 146.2 | 9.6 |
|  | 1750 | 81.5 | 5.34 |  | 1750 | 111.1 | 7.27 |  | 1750 | 150.5 | 9.86 |
|  | 1800 | 83.8 | 5.49 |  | 1800 | 114.2 | 7.48 |  | 1800 | 154.8 | 10.14 |
|  | 1850 | 86.2 | 5.64 |  | 1850 | 117.4 | 7.69 |  | 1850 | 159.1 | 10.42 |
|  | 1900 | 88.5 | 5.79 |  | 1900 | 120.6 | 7.90 |  | 1900 | 163.4 | 10.70 |
|  | 1950 | 90.8 | 5.95 |  | 1950 | 123.8 | 8.10 |  | 1950 | 167.7 | 10.98 |

FROM FIG. 9A / TO FIG. 9D

FIG. 9B

| Transmission | |
|---|---|
| CAT TH55-E70 Ratios | |
| 1st Gear | 6.25 |
| 2nd Gear | 4.59 |
| 3rd Gear | 3.38 |
| 4th Gear | 2.48 |
| 5th Gear | 1.83 |
| 6th Gear | 1.36 |
| 7th Gear | 1.00 |

| Frac Pump | | |
|---|---|---|
| Fluid End Bore | Triplex BBL/rev | |
| 4.0" | 0.05167 | |
| 4.5" | 0.06548 | |
| 5.0" | 0.08095 | |

CAT THSS-E70 Transmission, Quint Pumps

| Quint 5.0" | Engine rpm | Pump Crank rpm | Pump BPM | Quint 5.0" | Engine rpm | Pump Crank rpm | Pump BPM |
|---|---|---|---|---|---|---|---|
| 3rd Gear | 1500 | 69.9 | 5.65 | 4th Gear | 1500 | 95.2 | 7.71 |
| | 1550 | 72.2 | 5.84 | | 1550 | 98.4 | 7.96 |
| | 1600 | 74.5 | 6.03 | | 1600 | 101.6 | 8.22 |
| | 1650 | 76.8 | 6.22 | | 1650 | 104.7 | 8.48 |
| | 1700 | 79.2 | 6.41 | | 1700 | 107.9 | 8.73 |
| | 1750 | 81.5 | 6.60 | | 1750 | 111.1 | 8.99 |
| | 1800 | 83.8 | 6.79 | | 1800 | 114.2 | 9.25 |
| | 1850 | 86.2 | 6.97 | | 1850 | 117.4 | 9.51 |
| | 1900 | 88.5 | 7.16 | | 1900 | 120.6 | 9.76 |
| | 1950 | 90.8 | 7.35 | | 1950 | 123.8 | 10.02 |

| Quint 5.0" | Engine rpm | Pump Crank rpm | Pump BPM |
|---|---|---|---|
| 5th Gear | 1500 | 129.0 | 10.44 |
| | 1550 | 133.3 | 10.79 |
| | 1600 | 137.6 | 11.14 |
| | 1650 | 141.9 | 11.49 |
| | 1700 | 146.2 | 11.84 |
| | 1750 | 150.5 | 2.18 |
| | 1800 | 154.8 | 2.53 |
| | 1850 | 159.1 | 2.88 |
| | 1900 | 163.4 | 3.23 |
| | 1950 | 167.7 | 3.58 |

| Transmission CAT TH55-E70 Ratios | |
|---|---|
| 1st Gear | 6.25 |
| 2nd Gear | 4.59 |
| 3rd Gear | 3.38 |
| 4th Gear | 2.48 |
| 5th Gear | 1.83 |
| 6th Gear | 1.36 |
| 7th Gear | 1.00 |

| Frac Pump Fluid End Bore | Triplex BBL/rev |
|---|---|
| 4.0" | 0.05167 |
| 4.5" | 0.06548 |
| 5.0" | 0.08095 |

FROM FIG. 9B
FROM FIG. 9C

FIG. 9D

| Transmission TA90-8501 | Ratios |
|---|---|
| 1st Gear | 4.47 |
| 2nd Gear | 3.57 |
| 3rd Gear | 2.85 |
| 4th Gear | 2.41 |
| 5th Gear | 1.92 |
| 6th Gear | 1.54 |
| 7th Gear | 1.25 |
| 8th Gear | 1.00 |
| 9th Gear | 0.80 |

| Frac Pump | |
|---|---|
| Fluid End Bore | Quint BBL/rev |
| 4.0" | 0.05167 |
| 4.5" | 0.06548 |
| 5.0" | 0.08095 |

Twin Disc TA90-8501 - Quint Pumps 4.0" Fluid End

1st Gear:

| Engine rpm | Pump Crank rpm | Pump BPM |
|---|---|---|
| 1500 | 52.8 | 2.73 |
| 1550 | 54.6 | 2.82 |
| 1600 | 56.3 | 2.91 |
| 1650 | 58.1 | 3.00 |
| 1700 | 59.9 | 3.09 |
| 1750 | 61.6 | 3.18 |
| 1800 | 63.4 | 3.28 |
| 1850 | 65.1 | 3.37 |
| 1900 | 66.9 | 3.46 |
| 1950 | 68.7 | 3.55 |

2nd Gear:

| Engine rpm | Pump Crank rpm | Pump BPM |
|---|---|---|
| 1500 | 66.1 | 3.42 |
| 1550 | 68.3 | 3.53 |
| 1600 | 70.5 | 3.65 |
| 1650 | 72.8 | 3.76 |
| 1700 | 75.0 | 3.87 |
| 1750 | 77.2 | 3.99 |
| 1800 | 79.4 | 4.10 |
| 1850 | 81.6 | 4.21 |
| 1900 | 83.8 | 4.33 |
| 1950 | 86.0 | 4.44 |

3rd Gear:

| Engine rpm | Pump Crank rpm | Pump BPM |
|---|---|---|
| 1500 | 82.8 | 4.28 |
| 1550 | 85.6 | 4.42 |
| 1600 | 88.4 | 4.57 |
| 1650 | 91.1 | 4.71 |
| 1700 | 93.9 | 4.85 |
| 1750 | 96.7 | 4.99 |
| 1800 | 99.4 | 5.14 |
| 1850 | 102.2 | 5.28 |
| 1900 | 104.9 | 5.42 |
| 1950 | 107.7 | 5.56 |

4.5" Fluid End

1st Gear:

| Engine rpm | Pump Crank rpm | Pump BPM |
|---|---|---|
| 1500 | 52.8 | 3.46 |
| 1550 | 54.6 | 3.57 |
| 1600 | 56.3 | 3.69 |
| 1650 | 58.1 | 3.80 |
| 1700 | 59.9 | 3.92 |
| 1750 | 61.6 | 4.04 |
| 1800 | 63.4 | 4.15 |
| 1850 | 65.1 | 4.27 |
| 1900 | 66.9 | 4.38 |
| 1950 | 68.7 | 4.50 |

2nd Gear:

| Engine rpm | Pump Crank rpm | Pump BPM |
|---|---|---|
| 1500 | 66.1 | 4.33 |
| 1550 | 68.3 | 4.48 |
| 1600 | 70.5 | 4.62 |
| 1650 | 72.8 | 4.76 |
| 1700 | 75.0 | 4.91 |
| 1750 | 77.2 | 5.05 |
| 1800 | 79.4 | 5.20 |
| 1850 | 81.6 | 5.34 |
| 1900 | 83.8 | 5.49 |
| 1950 | 86.0 | 5.63 |

3rd Gear:

| Engine rpm | Pump Crank rpm | Pump BPM |
|---|---|---|
| 1500 | 82.8 | 5.42 |
| 1550 | 85.6 | 5.61 |
| 1600 | 88.4 | 5.79 |
| 1650 | 91.1 | 5.97 |
| 1700 | 93.9 | 6.15 |
| 1750 | 96.7 | 6.33 |
| 1800 | 99.4 | 6.51 |
| 1850 | 102.2 | 6.69 |
| 1900 | 104.9 | 6.87 |
| 1950 | 107.7 | 7.05 |

| Transmission TA90-8501 Ratios | |
|---|---|
| 1st Gear | 4.47 |
| 2nd Gear | 3.57 |
| 3rd Gear | 2.85 |
| 4th Gear | 2.41 |
| 5th Gear | 1.92 |
| 6th Gear | 1.54 |
| 7th Gear | 1.25 |
| 8th Gear | 1.00 |
| 9th Gear | 0.80 |

| Frac Pump | |
|---|---|
| Fluid End Bore | Quint BBL/rev |
| 4.0" | 0.05167 |
| 4.5" | 0.06548 |
| 5.0" | 0.08095 |

Twin Disc TA90-8501 - Quint Pumps

| 4th Gear | | | 5th Gear | | |
|---|---|---|---|---|---|
| Engine rpm | Pump Crank rpm | Pump BPM | Engine rpm | Pump Crank rpm | Pump BPM |
| 1500 | 98.0 | 5.06 | 1500 | 123.0 | 6.35 |
| 1550 | 101.2 | 5.23 | 1550 | 127.1 | 6.57 |
| 1600 | 104.5 | 5.40 | 1600 | 131.2 | 6.78 |
| 1650 | 107.8 | 5.57 | 1650 | 135.3 | 6.99 |
| 1700 | 111.0 | 5.74 | 1700 | 139.4 | 7.20 |
| 1750 | 114.3 | 5.91 | 1750 | 143.5 | 7.41 |
| 1800 | 117.6 | 6.07 | 1800 | 147.6 | 7.62 |
| 1850 | 120.8 | 6.24 | 1850 | 151.7 | 7.84 |
| 1900 | 124.1 | 6.41 | 1900 | 155.8 | 8.05 |
| 1950 | 127.4 | 6.58 | 1950 | 159.9 | 8.26 |

| 4th Gear | | | 5th Gear | | |
|---|---|---|---|---|---|
| Engine rpm | Pump Crank rpm | Pump BPM | Engine rpm | Pump Crank rpm | Pump BPM |
| 1500 | 98.0 | 6.42 | 1500 | 123.0 | 8.05 |
| 1550 | 101.2 | 6.63 | 1550 | 127.1 | 8.32 |
| 1600 | 104.5 | 6.84 | 1600 | 131.2 | 8.6 |
| 1650 | 107.8 | 7.06 | 1650 | 135.3 | 8.9 |
| 1700 | 111.0 | 7.27 | 1700 | 139.4 | 9.1 |
| 1750 | 114.3 | 7.48 | 1750 | 143.5 | 9.39 |
| 1800 | 117.6 | 7.70 | 1800 | 147.6 | 9.66 |
| 1850 | 120.8 | 7.91 | 1850 | 151.7 | 9.93 |
| 1900 | 124.1 | 8.13 | 1900 | 155.8 | 10.20 |
| 1950 | 127.4 | 8.34 | 1950 | 159.9 | 10.47 |

FROM FIG. 10A

| Transmission | |
|---|---|
| TA90-8501 | Ratios |
| 1st Gear | 4.47 |
| 2nd Gear | 3.57 |
| 3rd Gear | 2.85 |
| 4th Gear | 2.41 |
| 5th Gear | 1.92 |
| 6th Gear | 1.54 |
| 7th Gear | 1.25 |
| 8th Gear | 1.00 |
| 9th Gear | 0.80 |

| Frac Pump | |
|---|---|
| Fluid End Bore | Quint BBL/rev |
| 4.0" | 0.05167 |
| 4.5" | 0.06548 |
| 5.0" | 0.08095 |

FROM FIG. 10A

TO FIG. 10D

| 5.0" Fluid End | 1st Gear | | | 2nd Gear | | | 3rd Gear | | |
|---|---|---|---|---|---|---|---|---|---|
| | Engine rpm | Pump Crank rpm | Pump BPM | Engine rpm | Pump Crank rpm | Pump BPM | Engine rpm | Pump Crank rpm | Pump BPM |
| | 1500 | 52.8 | 4.28 | 1500 | 66.1 | 5.35 | 1500 | 82.8 | 6.71 |
| | 1550 | 54.6 | 4.42 | 1550 | 68.3 | 5.53 | 1550 | 85.6 | 6.93 |
| | 1600 | 56.3 | 4.56 | 1600 | 70.5 | 5.71 | 1600 | 88.4 | 7.15 |
| | 1650 | 58.1 | 4.70 | 1650 | 72.8 | 5.89 | 1650 | 91.1 | 7.38 |
| | 1700 | 59.9 | 4.85 | 1700 | 75.0 | 6.07 | 1700 | 93.9 | 7.60 |
| | 1750 | 61.6 | 4.99 | 1750 | 77.2 | 6.25 | 1750 | 96.7 | 7.82 |
| | 1800 | 63.4 | 5.13 | 1800 | 79.4 | 6.42 | 1800 | 99.4 | 8.05 |
| | 1850 | 65.1 | 5.27 | 1850 | 81.6 | 6.60 | 1850 | 102.2 | 8.27 |
| | 1900 | 66.9 | 5.42 | 1900 | 83.8 | 6.78 | 1900 | 104.9 | 8.49 |
| | 1950 | 68.7 | 5.56 | 1950 | 86.0 | 6.96 | 1950 | 107.7 | 8.72 |

FIG. 10C

MULTI-PLUNGER PUMPS AND ASSOCIATED DRIVE SYSTEMS

CROSS REFERENCE TO RELATED APPLICATIONS

This application is a continuation of U.S. patent application Ser. No. 16/827,166, entitled "Multi-plunger Pumps and Associated Drive Systems," filed Mar. 23, 2020, which is a continuation of U.S. patent application Ser. No. 16/210.807, entitled "Multi-plunger Pumps and Associated Drive Systems," filed Dec. 5, 2018, which claims priority to and the benefit of U.S. Provisional Patent Application No. 62/594,912, filed Dec. 5, 2017. The disclosures of the above-referenced priority applications are, hereby incorporated herein by reference.

BACKGROUND

1. Technical Field

This disclosure relates generally to drive systems for reciprocating plunger-style pumps used in hydraulic fracturing operations, and more particularly to multi-plunger hydraulic fracturing pumps and associated drive systems.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracking) operations typically require powering numerous components in order to recover oil and gas resources from the ground. For example, hydraulic fracturing usually includes pumps that inject fracking fluid down the wellbore, blenders that mix proppant into the fluid, cranes, wireline units, and many other components that all must perform different functions to carry out fracking operations.

Hydraulic fracturing operations commonly use diesel-powered pumps to transmit fluid media down the well bore, the transmissions for the diesel-powered pumps often having seven speeds or more. When one or more pumps go offline during operation, for example due to system failure or for scheduled maintenance, the speed of the remaining operating pumps is increased accordingly. However, many of the top gears in these diesel transmissions provide speeds that are above the critical speed for the associated plunger pumps. Thus, compensating for the downed pump or pumps by up-shifting operation of the remaining pumps to these higher gears, above the critical speed for the pumps, can result in damage to the pumps. There is a need for hydraulic fracturing pumps that are capable of operation at or below the critical speed, without sacrificing pump rate, efficiency, and efficacy.

SUMMARY

One of the most common transmissions utilized in hydraulic fracturing pump applications is a nine-speed transmission, often driven by a diesel-powered engine. When this transmission is in fifth gear and the engine is running at 1700 rotations per minute (rpm), for example, the critical speed of 120 rpm on an associated 8-inch stroke pump is reached. Therefore, running the pump with the transmission operating in any of gears six through nine, above the critical speed reached at gear five, could cause pump cavitation and damage accumulation to the fluid end of the pump.

It has historically been believed that pump cavitation is caused by air entering the pump. Through testing and data-gathering, however, Applicants have observed that pump cavitation and damage are caused by the formation of vacuum bubbles as a result of fluid being accelerated too fast through the pump. A heightened speed of operation creates low pressure within the pumps, creating vacuum bubbles. As the pump plungers retract, the vacuum bubbles implode, causing damage (cavitation) to the pump and engine systems. Although the risks of operating the pumps at too great of speeds may be known, concerns about lowered pump rates and lost efficiency resulting from maintaining slower transmission speeds commonly lead to disregard of the risks as an unavoidable consequence of maintaining pump efficiency.

In seeking to avoid such pump damage, Applicants have observed that, by operating transmissions such that pumps are maintained at or below critical pump speeds, such formation of vacuum bubbles and resulting pump cavitation and damage may be avoided. Further still. Applicants have observed that use of electric- or hydraulic-powered pumps may allow for better control of pump speeds at or below the critical speed due to the smaller increments between gear speeds as compared to those of pumps driven by diesel-powered engines.

Operation below critical pump speeds has previously been avoided as being considered inefficient and ineffective for pump usage in fracking, as slower pump speeds are historically believed to be directly tied to pump rates. Applicant has observed, however, that the introduction of multiple electric- or hydraulic-powered motors driving planetary gear trains can provide effective and efficient pumping power, thereby maintaining a consistent pump rate for fluid transfer, while also sustaining a pumping speed at or below the critical speed for the plungers. For example, Applicant discovered that varying pump bore sizes and stroke lengths, as well as number of plungers, allowed for operation at slower pump speeds while maintaining or increasing fluid pump rates. Applicant also discovered, through testing and analysis, that certain bore size, stroke length, and plunger number combinations provided maximum pump rate efficiency at a usable and economically effective overall pump size.

The present disclosure is directed to hydraulic fracturing system for fracturing a subterranean formation, according to various embodiments. In an embodiment, the hydraulic fracturing system can include a multi-plunger hydraulic fracturing pump fluidly connected to a well associated with the subterranean formation, and the multi-plunger pump can be configured to pump fluid into a wellbore associated with the well at a high pressure so that the fluid passes from the wellbore into the subterranean formation and fractures the subterranean formation. In an embodiment, the system can further include a plurality of motors positioned to power the multi-plunger pump, and a planetary gear train having a plurality of input pinion gears in rotational contact with each of the plurality of motors. In an embodiment, a gear ratio of the planetary gear train and a speed at which the plurality of motors operates can be selected so as to limit a maximum pump speed associated with the multi-plunger pump.

In an embodiment, the system can include a plurality of speed reduction gearboxes positioned between the plurality of input pinion gears and the plurality of motors so as to achieve a desired pump rate.

In an embodiment, the plurality of motors can include one of a plurality of electric motors or a plurality of hydraulic motors.

In an embodiment, the maximum pump speed can correlate to a critical plunger speed associated with each of the plurality of hydraulic pumps.

In an embodiment, the maximum pump speed can be 5% or less over a critical plunger speed associated with each of the plurality of hydraulic pumps.

In an embodiment, the plurality of hydraulic pumps includes an odd number of plungers greater than or equal to five plungers.

In an embodiment, a stroke length of each of the plungers associated with the plurality of hydraulic pumps can be selected to inversely relate to a pump speed associated with the plurality of hydraulic pumps so as to achieve a predetermined flow rate.

In an embodiment, the system can include a variable frequency drive (VFD) connected to the plurality of motors to control the speed of the plurality of motors. The VFD can be positioned to accelerate or decelerate pump rotational speeds associated with each of the plurality of hydraulic pumps, according to an embodiment.

In an embodiment, the VFD can include a plurality of VFDs, and the plurality of VFDs can be configured to share a load required to power the plurality of hydraulic pumps.

In an embodiment, the plurality of VFDs can be configured to automatically shut off in the event of an overpressure event with respect to the plurality of hydraulic pumps.

The present disclosure is also related to a hydraulic fracturing system for fracturing a subterranean formation, according to an embodiment. In an embodiment, the system can include a multi-plunger hydraulic fracturing pump fluidly connected to a well associated with the subterranean formation, and the multi-plunger pump can be configured to pump fluid into a wellbore associated with the well at a high pressure so that the fluid passes from the wellbore into the subterranean formation and fractures the subterranean formation. In an embodiment, a plurality of motors can be positioned to power the multi-plunger pump. The system can further include a variable frequency drive connected to the plurality of motors to control the speeds of the plurality of electric motors, according to an embodiment. In an embodiment, the system can include a planetary gear train having a plurality of input pinion gears in rotational contact with each of the plurality of motors. In an embodiment, a gear ratio of the planetary gear train and a speed at which the plurality of motors operates can be selected so as to limit a maximum pump speed associated with the multi-plunger pump.

The present disclosure is also directed to a method for pumping fluid into a wellbore associated with a subterranean formation. In an embodiment, the method can include fluidly connecting a multi-plunger hydraulic fracturing pump to a well associated with the subterranean formation such that the multi-plunger pump pumps fluid into the wellbore at a high pressure so that fluid passes from the wellbore into the subterranean formation and fractures the subterranean formation. In an embodiment, the method can include powering the multi-plunger pump with a plurality of motors. In an embodiment, the method can further include providing a planetary gear train having a plurality of input pinion gears in rotational contact with each of the plurality of motors so as to translate power from the plurality of motors into a desired pump rate of the multi-plunger pump.

Other aspects and features of the present disclosure will become apparent to those of ordinary skill in the art after reading the detailed description herein and the accompanying figures.

BRIEF DESCRIPTION OF DRAWINGS

Some of the features and benefits of the present invention having been stated, others will become apparent as the description proceeds when taken in conjunction with the accompanying drawings, in which:

FIGS. 4A-4D are tables showing calculations of plunger pump critical speeds according to embodiments of the present technology.

FIGS. 5A-5D are tables showing data related to certain pumps and transmissions in an example application, meant to highlight certain embodiments of the present technology.

FIGS. 6A-10D are tables showing additional data related to certain pumps and transmissions in further example applications, meant to further highlight embodiments of the present technology.

Figure 1:
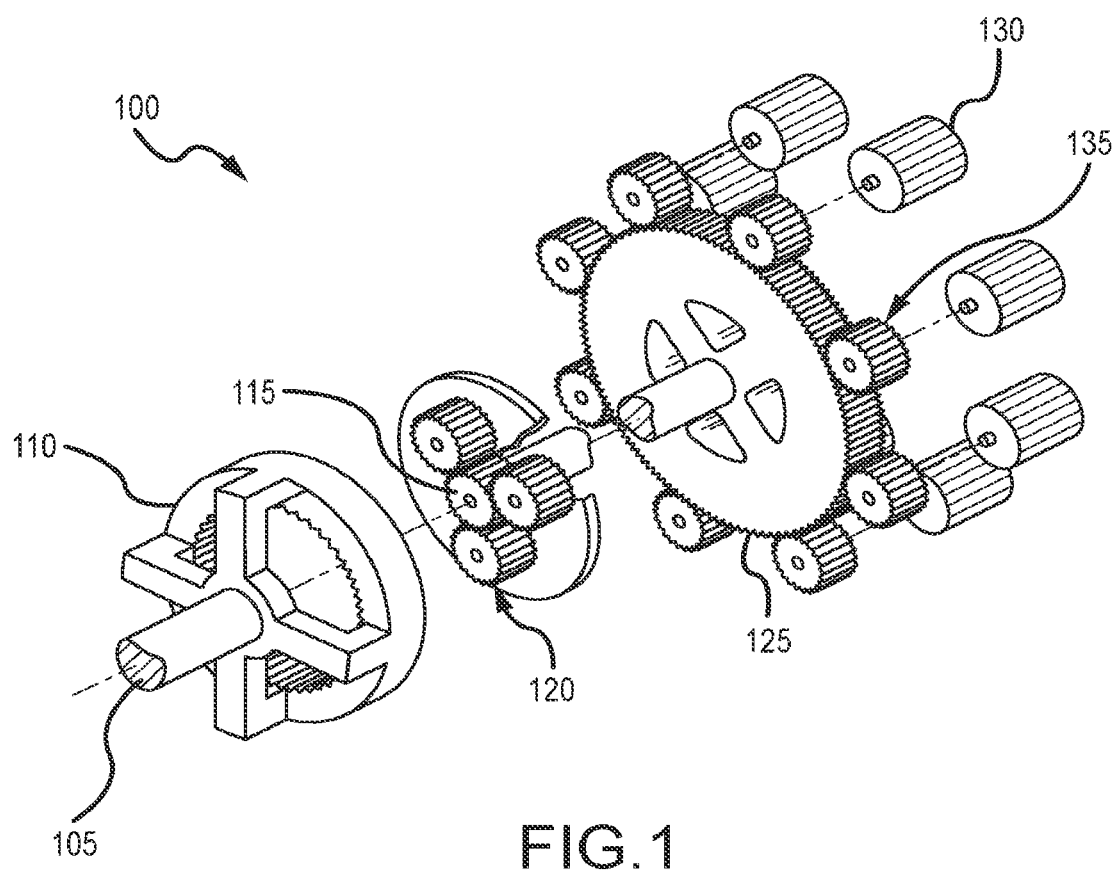
FIG. 1 is an exploded schematic example of a planetary gear train having multiple input pinions for direct connection to an electric motor, according to an embodiment.

While the invention will be described in connection with the preferred embodiments, it will be understood that the included description is not intended to limit the invention to the described preferred embodiments. On the contrary, the description is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Described herein is an example of a method and system for providing reciprocating, plunger-style pumps as part of a multi-plunger system for use in hydraulic fracturing operations. Also described are various drive systems for use with the described reciprocating, plunger-style pumps. In various embodiments, the pumps and drive systems may be utilized by conventionally powered (i.e., diesel engine-driven) hydraulic fracturing pumping systems, or in other embodiments by hydraulically powered or electrically powered hydraulic fracturing pumping systems.

Multi-plunger hydraulic fracturing pumps, though known in the art, are typically limited to either triplex (three plungers) or quintuplex (five plungers) arrangements. Common hydraulic fracturing pumps often utilize 8-inch, 10-inch, and 11-inch stroke triplex and quintuplex hydraulic fracturing pumps. Hydraulic fracturing pumps are commonly driven by an engine (usually a 2500 horsepower (HP) diesel engine) and a multiple speed transmission, usually having seven speeds or more. However, many of the top gears, depending on the manufacturer and gear ratios, provide speeds that are above the critical speed of a plunger pump. FIG. 4 details calculations of such plunger critical speeds.

For example, one of the most common transmissions utilized in hydraulic fracturing pump applications is the Caterpillar model TH55-E90, which is a 9-speed transmission. As shown in FIGS. 5A-5D, when this transmission is in $5^{th}$ gear and the engine is operating at 1700 rpm, the critical speed of 120 rpm on an 8-inch stroke pump is reached. Therefore, running the pump with the transmission in any of gears 6 through 9 could cause pump cavitation and damage accumulation to the fluid end.

Similarly, the common hydraulic fracturing application transmissions known in the art may exhibit the same issues in higher gears, as shown below in FIGS. 6A-10D. For example, as shown in FIGS. 6A-6D and FIGS. 7A-7D, the critical plunger speed is reached in the $3^{rd}$ gear, such that use of gears 4-7 may cause cavitation and damage accumulation. Similarly, as shown in FIGS. 8A-8D and FIGS. 9A-9D, the critical plunger speed is reached in the $4^{th}$ gear, such that use of gears 5-7 may cause cavitation and damage accumulation. In FIGS. 10A-10D, the critical plunger speed is reached in the $4^{th}$ gear, such that use of gears 5-9 may result in cavitation and damage accumulation.

Use of the multi-plunger hydraulic fracturing pumps according to the present disclosure may eliminate the need for a diesel engine and transmission. As shown above, diesel engines and transmissions often include multiple gears that accelerate the plunger speed above critical operating speeds. This elimination of the typical engine and transmission from hydraulic fracturing pump units may enable the pumps to be driven by multiple electric motors, according to some embodiments, or multiple hydraulic motors according to other embodiments. These electric or hydraulic motors may have fewer gears such that operation in gears that increase the plunger speeds above their critical speeds can be avoided. By using multiple motors, whether hydraulic or electric, to drive a single pump, pump rates can be increased without exceeding critical plunger speeds.

Use of electric or hydraulic motors, rather than diesel motors, may also make maintenance, repair, and replacement of the electric motors safer and faster than single or double electric motor-driven pumps. This configuration may prevent the fracturing pumps from being run at speeds higher than the critical plunger speed, which may help to minimize pump cavitation and damage accumulation, thus greatly extending the usable life of the pump fluid ends. For example, as discussed in more detail below, the system could be designed to allow only a slight overspeed of the pumps beyond the identified critical pump speed as a safety margin in the event that one of the fleet's pumps were taken offline for repairs or maintenance, and an additional rate of the remaining online pumps were required to complete the stage being pumped.

In the multiple electric motor-driven embodiment of the present disclosure, the electric motors may directly drive the pump, and the gear ratios of the planetary drive along with the electric motor-rated speeds may be chosen to limit the maximum pump speed, so as to not exceed the plunger critical speed. However, the gear ratios and electric motor-rated speeds may also be chosen to allow only a slight percentage of overspeed (higher than critical plunger speed) as a safe margin to enable a fleet of operating pumps to achieve a desired pump rate, for example when one pump is taken off line, as is often the case in hydraulic fracturing. For example, the gear ratios and electric motor-rated speeds may be chosen to operate 5% or less above the critical plunger speed according to some examples; 10% or less above the critical plunger speed according to some examples; or any other acceptable range as will be readily understood by one having ordinary skill in the art. Repairs or maintenance are generally performed as quickly as possible so that the offline pump is available by the next sequential fracturing stage. This same logic could be applied to the hydraulic motor driven system or the system that utilizes speed reduction gearboxes driving a single ring gear.

By the present disclosure, multi-plunger hydraulic fracturing pumps utilizing higher multiples of plungers, such as 7, 9, 11, 13, etc. (septenplex, novenplex, undenplex, tredenplex, etc.), are described. In some embodiments, more than 13 plungers may be utilized, as will be readily understood by one having ordinary skill in the art. In some embodiments, odd numbers of plungers may be chosen so that the pump flow ripple magnitude is minimized. For example, in multi-plunger hydraulic fracturing pumps having higher numbers of plungers, the plunger ripple frequency may be increased, thereby reducing the amount of time between ripples, which may provide a smoother pressure performance for the pumps.

In some embodiments, longer stroke lengths of the plunger pumps may be utilized to reduce plunger speed. For example, a 10-inch stroke pump of a given plunger size may be run at a slower speed than an 8-inch stroke pump of the same plunger size, in order to accomplish the same flow rate. Slowing the plunger down may also decrease the possibility of pump cavitation. For example, when triplex and quintuplex pumps, as are known in the art, are operated at higher rates, conditions for cavitation to occur are measurably higher. According to an embodiment, a critical pump speed may be 120 rpm of the pump crankshaft. With this pump speed, on the currently used 8-inch stroke pumps, the rotational speed translates to an average linear speed of the plungers at a velocity of 32 inches per second. At higher speeds, with every stroke of the plungers, fluid is accelerated into and out of the pump fluid end, creating a likelihood of low pressure regions within the fluid end that approach or dip below vapor pressure values for the fluid, thereby causing cavitation, and ultimately damage accumulation, to occur. The use of longer stroke plungers accordingly contributes critically to longer fluid end life.

Various drive systems for powering multi-plunger hydraulic fracturing pumps are contemplated. According to an embodiment, multiple electric motors may be utilized to power the multi-plunger hydraulic fracturing pump. The number of motors utilized may be selected based on the output hydraulic horsepower for which the pump is designed, in some examples. In other examples, the number of motors could be determined on an "n plus 1" basis, in which "n" number of motors would be adequate to provide enough input power according to the output hydraulic horsepower for which the pump is designed, and one ("1") additional motor would be included to allow for a single motor failure or maintenance situation. In such a situation, the failed motor (or motor purposefully removed for maintenance) could be disconnected from the electrical circuit and allowed to freewheel, while the remaining operational motors would still provide adequate power for the pump, according to an embodiment.

In the example illustrated in FIG. 1, an exploded schematic view shows an embodiment of a planetary gear train 100 in which the multiple input pinion gears 135 are directly connected to the electric motors 130. According to the illustrated embodiment, both ends of the pump crankshaft 105 may be powered with an identical planetary gear train 120 and electric motors 130 to enable the motors 130 to be sized small enough to simplify motor removal and installation as compared to a larger single electric motor, or a double electric motor drive system.

Figure 3:
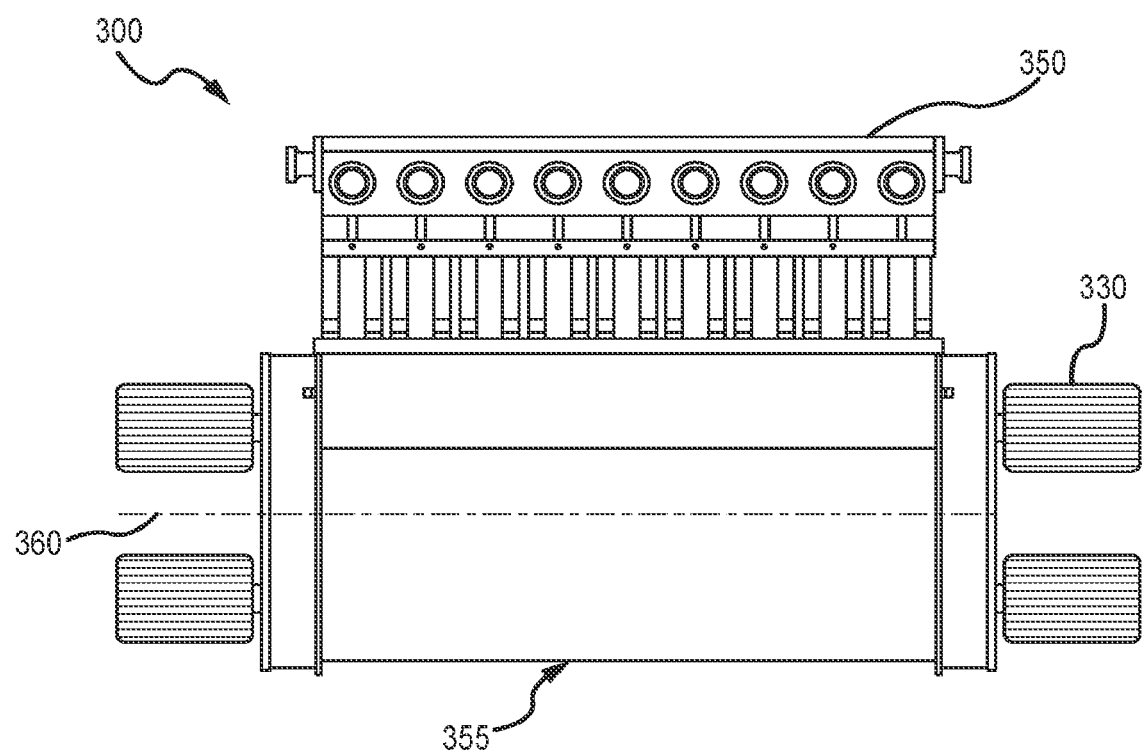
FIG. 3 is a schematic example of a multi-plunger pump having nine plungers and four electric motors mounted for driving the multi-plunger pump, according to an embodiment.
Figure 5D:
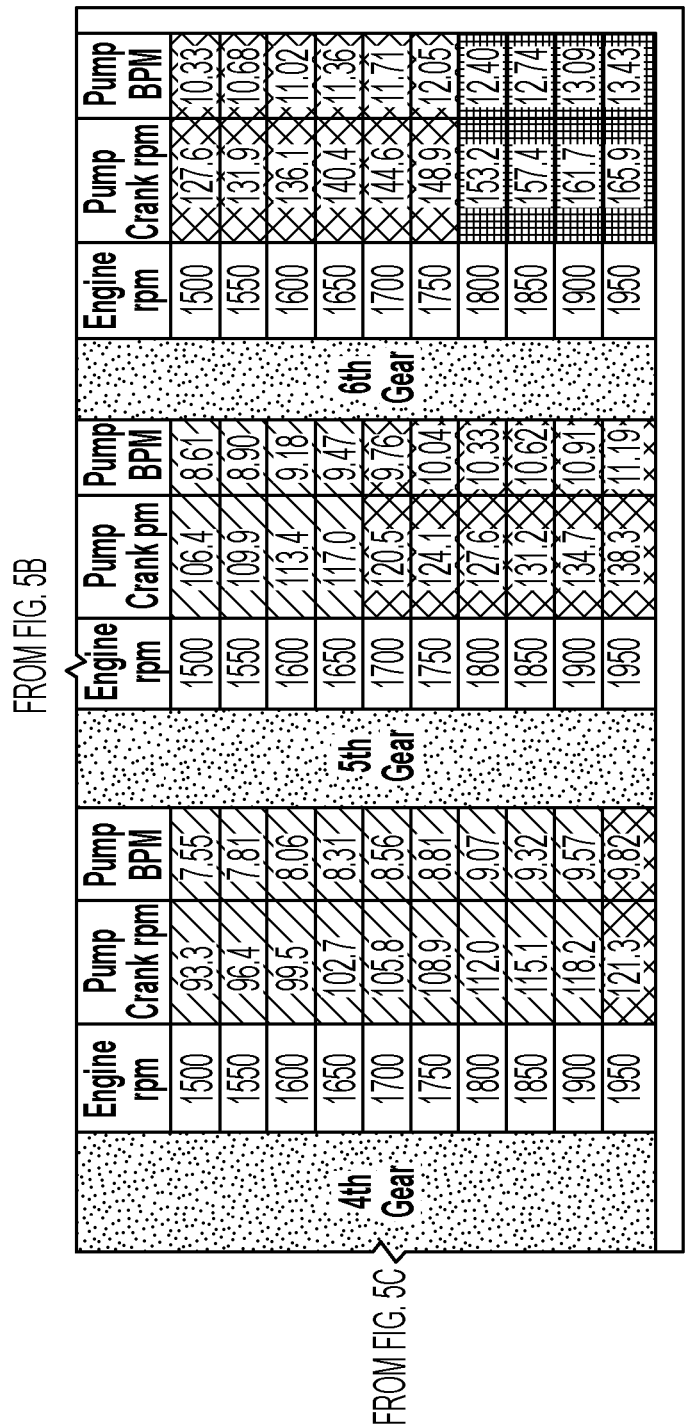
Figure 6A:
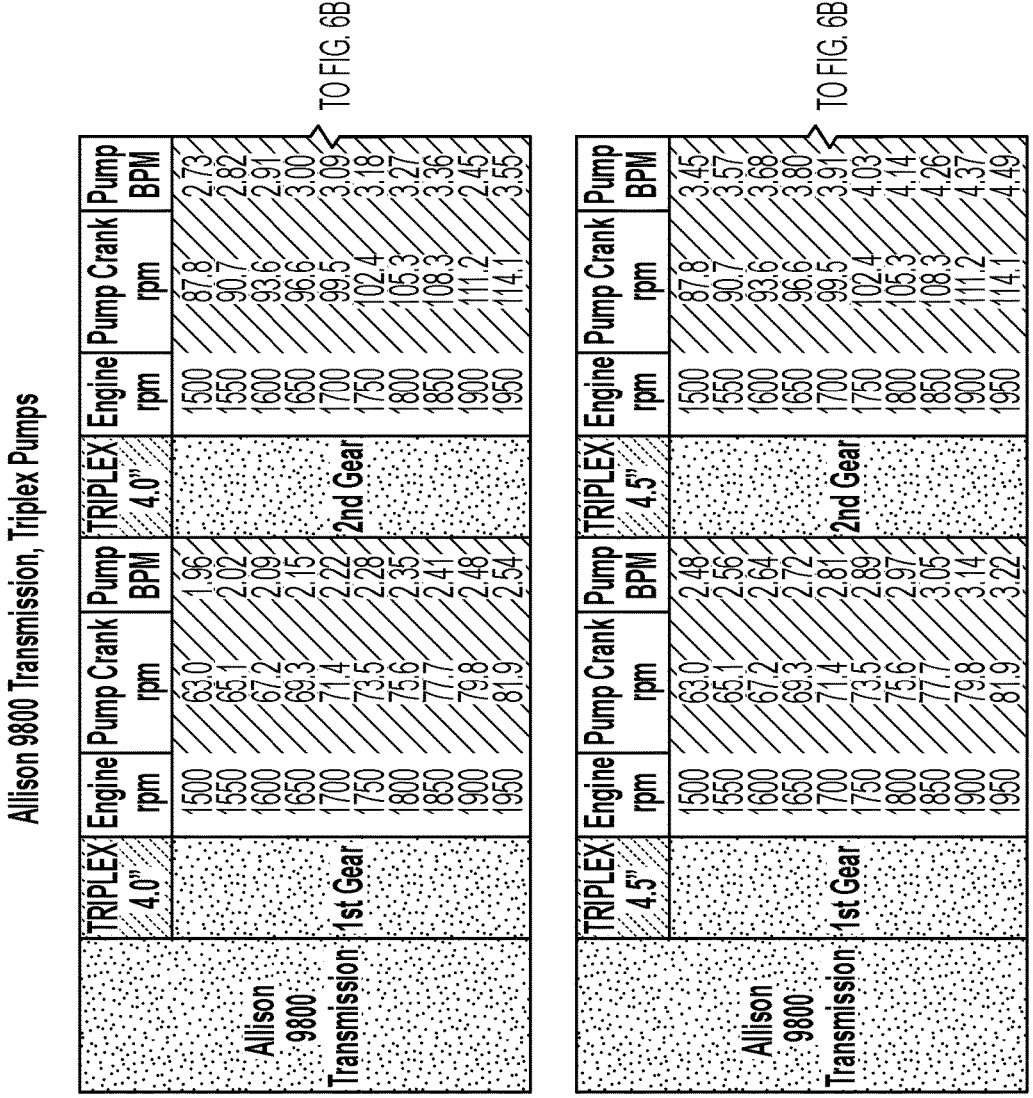
Figure 6B:
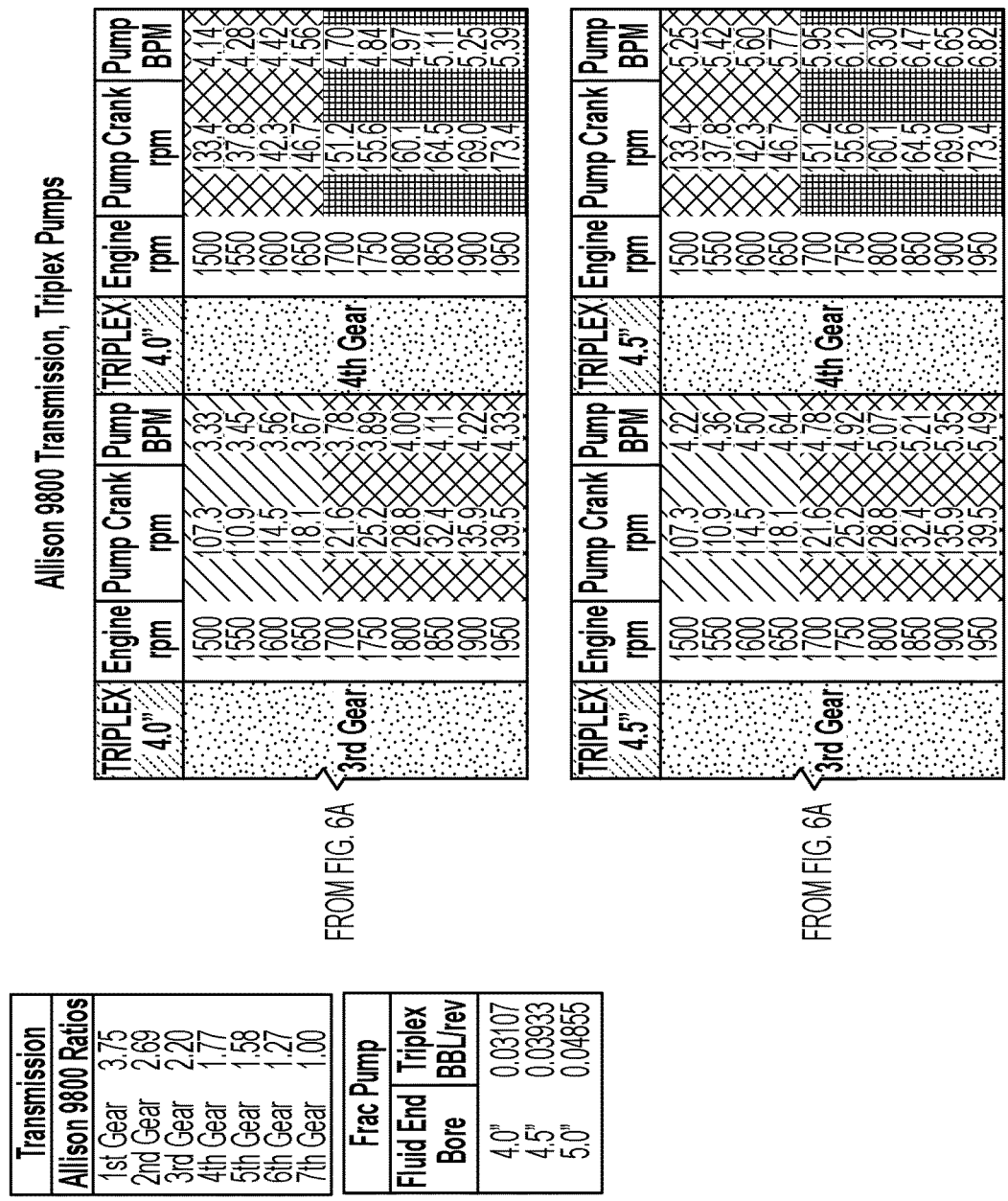
Figure 9C:
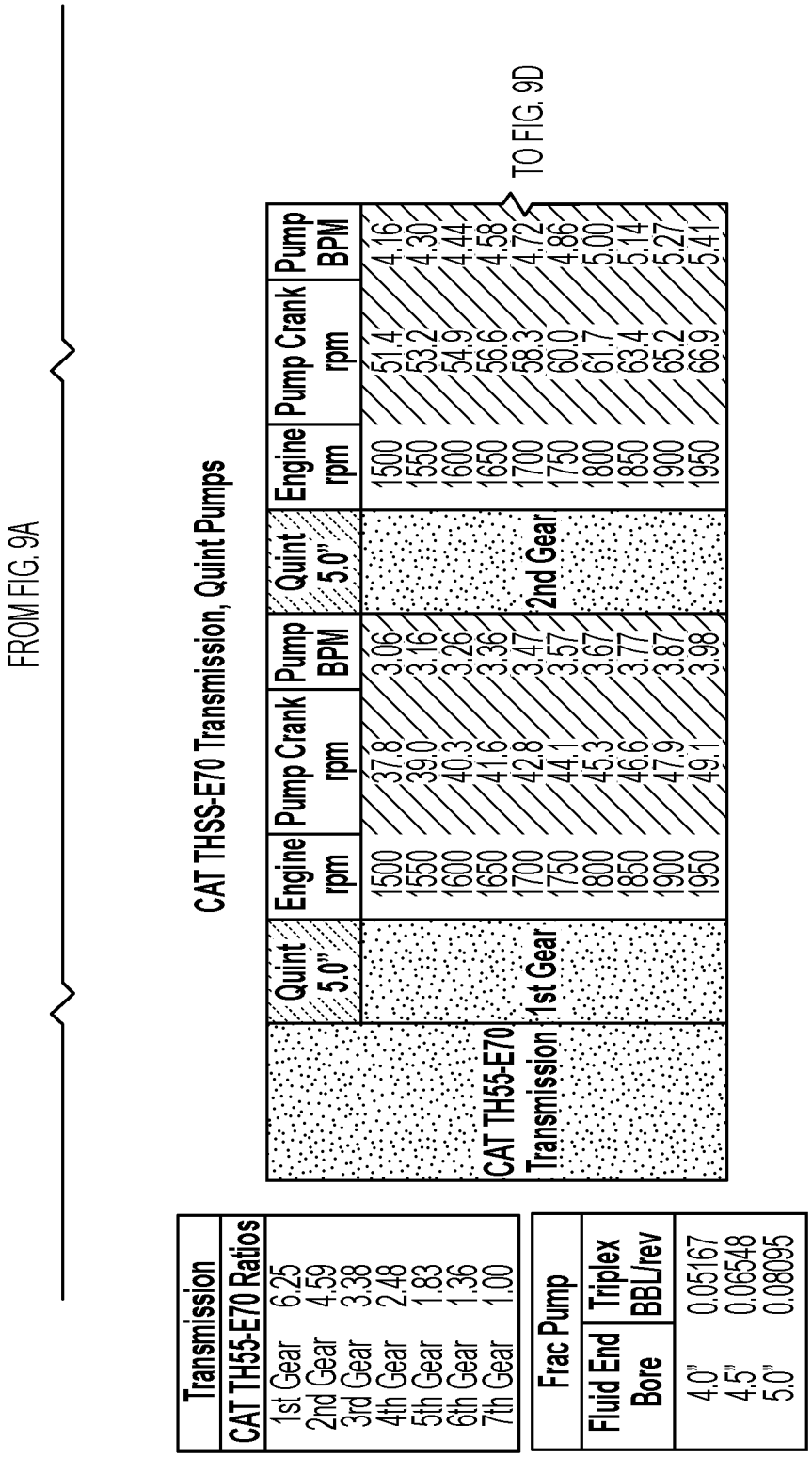
Figure 10D:
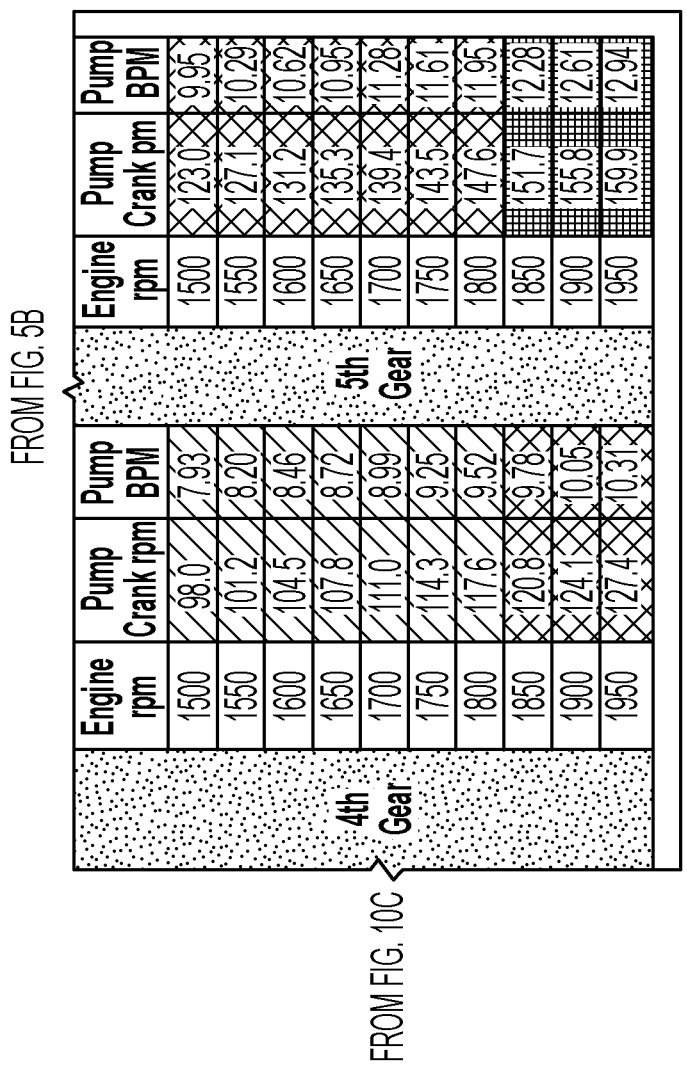

In the illustrated embodiment of FIG. 1, eight electric motors 130 may correspond to and drive eight input pinion gears 135 associated with a single main planetary gear 125. The main planetary gear 125 may in turn drive the sun gear 115 positioned central to three planetary gears 120. The final drive gear 110 may have internal gear teeth positioned to catch the external gear teeth of the three planetary gears 120, which may cause rotation of the pump crankshaft 105. In this way, a plurality of electric motors 130 may provide power to a pump crankshaft 105, which may in turn drive a multi-plunger pump, for example as illustrated in FIG. 3 and discussed in greater detail below.

In another embodiment, multiple hydraulic motors may be utilized to power a multi-plunger hydraulic fracturing pump, in which a planetary gear train system 100 similar to that illustrated in FIG. 1 could also be utilized. In an example, a planetary gear train system may be utilized on one or both ends of the pump crankshaft to allow for smaller hydraulic motors to be utilized.

Figure 2:
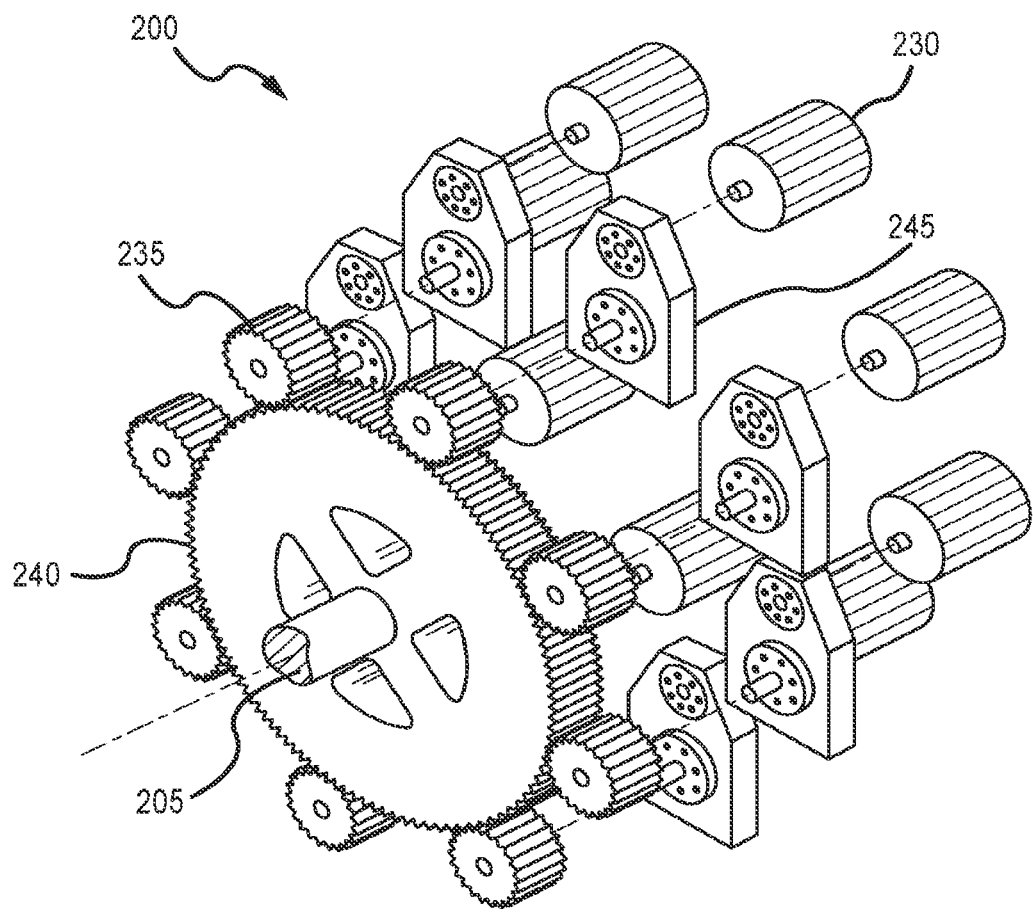
FIG. 2 is an exploded schematic example of a planetary gear train having a speed reduction gearbox mounting for connection to an electric motor, according to an embodiment.

According to an alternate embodiment, for example as illustrated in FIG. 2, a plurality of electric motors or hydraulic motors 230 each may be mounted to a plurality of speed reduction gearboxes 245. FIG. 2 illustrates an exploded schematic example of a planetary gear train 200 having a plurality of speed reduction gearbox 245 mountings for connection to a plurality of electric motors 230, according to an embodiment. The speed reduction gearboxes 245 may, in turn, power a single ring gear 240 to turn the pump crankshaft 205 at the proper rpm needed to drive the multi-plunger pumps at the desired pump rate. In some examples, this configuration may not require use of a multi-planetary gear train system as described above and illustrated in FIG. 1, for example. For example, as illustrated in the embodiment of FIG. 2, the plurality of electric motors 230 may drive the main planetary gear in the form of a ring gear 240 through speed reduction gearboxes 245, and the ring gear 240 may directly turn the pump crankshaft 205. In such an example additional planetary gears 120, as illustrated in the embodiment of FIG. 1, for example, may not be included.

In an embodiment utilizing multiple electric motors, the fleet of fracturing pumps may be powered by multiple electric motors, and overall electric power may be generated by one or more diesel or gas turbines. When the pumps are being brought online to pump fluids into the well, the power may be switched via appropriate switchgear to the electric motors.

In some embodiments, the speed of the motors may be controlled by one or more variable frequency drives (VFD), which may accelerate or decelerate the pump rotational speeds using an S curve. The pump operator may select the various pump speeds via a human-machine interface (HMI) according to some embodiments, for example from inside a data van, or from a "suitcase," which is a portable, stand-alone HMI. The HMI or suitcase may allow on/off control of the pumps as well as speed control of the pumps, to allow the pumps to run at speeds from zero crankshaft rpm up to the maximum speed, which would correlate with the plunger critical speed.

According to an embodiment, one of the VFDs may be designated as the master VFD, and the remaining VFDs may be designed to share the load required to power the pump under all load conditions. In the case of an overpressure event, the hydraulic fracturing controls may automatically turn the VFD off using the on/off signal for rapid shutdown, instead of using the rpm command, which uses an S curve to control the acceleration and/or deceleration. A manual emergency shutdown may also be included, which uses an HMI (such as a push button or other HMI, which may be electronic and/or manual) to shut off the VFD using the on/off function. This manual emergency shutdown feature may be configured to shut down all VFDs simultaneously, thereby shutting down the entire site. The emergency shutdown may also be configured to stop the VFD on the blender discharge pumps, and may or may not be tied into the electrical microgrid to open breakers, thereby stopping the flow and/or generation of electricity and/or gas compression.

The HMI may be designed to allow only a slight percentage of overspeed (higher than critical plunger speed) as a safe margin to enable a fleet of operating pumps to achieve a desired pump rate when one pump is taken offline, for example, as is often the case in hydraulic fracturing. Repairs or maintenance are generally performed as quickly as possible so that the offline pump is available by the next sequential fracturing stage. This same logic could be applied to the hydraulic motor driven system or the system that utilizes speed reduction gearboxes driving a single ring gear.

FIG. 3 illustrates a schematic example of a multi-plunger pump 300 with four electric motors mounted to the pump for driving the multi-plunger pump, according to an embodiment. In the illustrated embodiment, the multi-plunger pump 300 may include nine plungers positioned at the multi-plunger fluid end 350 of the multi-plunger pump 300. In other embodiments, various other numbers of plungers may be included, as will be readily understood by one having ordinary skill in the art.

A crankshaft centerline 360 may bisect the multi-plunger pump 300 between the multi-plunger fluid end 350 and the pump power end 355. Two electric motors 330 may be positioned on opposing sides of the multi-plunger pump 300, across the crankshaft centerline 360. The four total electric motors 330 may drive the crankshaft associated with the nine plungers, as described above with respect to FIGS. 1 and 2. For example, in some embodiments the four electric motors 330 may drive the crankshaft via one or more planetary gear trains. In some embodiments, a plurality of speed reduction gearboxes may be positioned between the electric motors 330 and the one or more planetary gear trains so as to control the rotational speed of the one or more planetary gear trains and, ultimately, the pump rate of the plungers.

The present invention described herein, therefore, is well adapted to carry out the objects and attain the ends and advantages mentioned, as well as others inherent therein.

While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A hydraulic fracturing system for fracturing a subterranean formation, the hydraulic fracturing system comprising:
 a multi-plunger hydraulic fracturing pump configured to pump fluid to a wellbore associated with the subterranean formation, the multi-plunger hydraulic fracturing pump comprising a pump crankshaft;
 a plurality of motors positioned to power the multi-plunger hydraulic fracturing pump; and
 a planetary gear train positioned to translate power from the plurality of motors to the pump crankshaft of the multi-plunger hydraulic fracturing pump, the planetary gear train comprising:
  a plurality of input pinion gears connected to the plurality of motors; and
  a final drive gear connected to the pump crankshaft of the multi-plunger hydraulic fracturing pump by a plurality of arms extending from the final drive gear.

2. The hydraulic fracturing system of claim 1, wherein the plurality of motors comprises a plurality of electric motors, and each of the plurality of input pinion gears is connected to a respective one of the plurality of electric motors.

3. The hydraulic fracturing system of claim 1, wherein the multi-plunger hydraulic fracturing pump has three plungers.

4. The hydraulic fracturing system of claim 1, wherein the multi-plunger hydraulic fracturing pump has five plungers.

5. The hydraulic fracturing system of claim 1, wherein the multi-plunger hydraulic fracturing pump has seven plungers.

6. The hydraulic fracturing system of claim 1, wherein the multi-plunger hydraulic fracturing pump has nine plungers.

7. The hydraulic fracturing system of claim 1, further comprising a variable frequency drive (VFD) associated with the plurality of motors and configured to control a pump rotational speed of the multi-plunger hydraulic fracturing pump.

8. The hydraulic fracturing system of claim 1, wherein the planetary gear train comprises a main gear that contacts each of the plurality of input pinion gears, wherein the main gear comprises external gear teeth that mate with external gear teeth of the plurality of input pinion gears.

9. The hydraulic fracturing system of claim 8, wherein the planetary gear train comprises:
 a sun gear connected to the main gear by a shaft extending from the main gear; and
 a plurality of planetary gears that each contact the sun gear and the final drive gear, wherein each of the plurality of planetary gears comprises external gear teeth that mate with external gear teeth of the sun gear and with internal gear teeth of the final drive gear.

10. A hydraulic fracturing method comprising:
 by operation of a multi-plunger hydraulic fracturing pump of a hydraulic fracturing system, pumping fluid to a wellbore associated with a subterranean formation, the multiplunger hydraulic fracturing pump comprising a pump crankshaft;
 powering the multi-plunger hydraulic fracturing pump with a plurality of motors; and
 translating power from the plurality of motors to the multi-plunger hydraulic fracturing pump through a planetary gear train, wherein translating power through the planetary gear train comprises translating power through:
  a plurality of input pinion gears that are driven by the plurality of motors; and
  a final drive gear that drives the pump crankshaft, wherein the final drive gear is connected to the pump crankshaft by a plurality of arms extending from the final drive gear.

11. The hydraulic fracturing method of claim 10, wherein the plurality of motors comprises a plurality of electric motors, and each of the plurality of input pinion gears is driven by a respective one of the plurality of electric motors.

12. The hydraulic fracturing method of claim 10, wherein the multi-plunger hydraulic fracturing pump has three plungers.

13. The hydraulic fracturing method of claim 10, wherein the multi-plunger hydraulic fracturing pump has five plungers.

14. The hydraulic fracturing method of claim 10, wherein the multi-plunger hydraulic fracturing pump has seven plungers.

15. The hydraulic fracturing method of claim 10, wherein the multi-plunger hydraulic fracturing pump has nine plungers.

16. The hydraulic fracturing method of claim 10, comprising, by operation of a variable frequency drive (VFD), controlling a pump rotational speed of the multi-plunger hydraulic fracturing pump.

17. The hydraulic fracturing method of claim 10, wherein translating power through the planetary gear train comprises translating power through a main gear that contacts each of the plurality of input pinion gears, wherein the main gear comprises external gear teeth that mate with external gear teeth of the plurality of input pinion gears.

18. The hydraulic fracturing method of claim 17, wherein translating power through the planetary gear train comprises translating power through:
 a sun gear connected to the main gear by a shaft extending from the main gear; and
 a plurality of planetary gears that contact the sun gear and the final drive gear, wherein each of the plurality of planetary gears comprises external gear teeth that mate with external gear teeth of the sun gear and with internal gear teeth of the final drive gear.

19. The hydraulic fracturing method of claim 10, comprising limiting a maximum pump speed of the multi-plunger hydraulic fracturing pump, wherein the maximum pump speed is limited by a selection of a gear ratio of the planetary gear train and a speed at which the plurality of motors operate.

20. The hydraulic fracturing method of claim 19, wherein the maximum pump speed correlates with a critical plunger speed of the multi-plunger hydraulic fracturing pump.

21. The hydraulic fracturing method of claim 19, wherein the maximum pump speed is 5% over a critical plunger speed of the multi-plunger hydraulic fracturing pump.

22. A hydraulic fracturing system for fracturing a subterranean formation, the hydraulic fracturing system comprising:
 a plurality of electric motors;
 a planetary gear train connected to the plurality of electric motors, the planetary gear train comprising:
  a plurality of input pinion gears, each driven by a respective one of the plurality of electric motors;

a main gear driven by the plurality of input pinion gears, the main gear comprising external gear teeth that mate with external gear teeth of the plurality of input pinion gears;

a sun gear driven by the main gear and connected to the main gear by a shaft;

planetary gears driven by the sun gear, the planetary gears each comprising external gear teeth that mate with external gear teeth of the sun gear; and a final drive gear driven by the planetary gears, the final drive gear comprising internal gear teeth that mate with the external gear teeth of the planetary gears; and a multi-plunger hydraulic fracturing pump that pumps fluid to a wellbore and comprises a pump crankshaft that is driven by the final drive gear of the planetary gear train, the final drive gear connected to the pump crankshaft by a plurality of arms extending from the final drive gear.

23. The hydraulic fracturing system of claim 22, further comprising a variable frequency drive (VFD) associated with the plurality of motors and configured to control a pump rotational speed of the multi-plunger hydraulic fracturing pump.

24. The hydraulic fracturing system of claim 23, wherein the multi-plunger hydraulic fracturing pump comprises seven plungers.

25. The hydraulic fracturing system of claim 23, wherein the multi-plunger hydraulic fracturing pump comprises nine plungers.

* * * * *